US008864876B2

(12) United States Patent
Neumann et al.

(10) Patent No.: US 8,864,876 B2
(45) Date of Patent: Oct. 21, 2014

(54) INDIRECT AND DIRECT METHOD OF SEQUESTERING CONTAMINATES

(75) Inventors: David Kurt Neumann, Colorado Springs, CO (US); Boris R. Nizamov, Colorado Springs, CO (US); Thomas Lee Henshaw, Monument, CO (US); Jeremy L. Anderson, Colorado Springs, CO (US)

(73) Assignee: Neumann Systems Group, Inc., Colorado Springs, CO (US)

( * ) Notice: Subject to any disclaimer, the term of this patent is extended or adjusted under 35 U.S.C. 154(b) by 0 days.

(21) Appl. No.: 12/586,808

(22) Filed: Sep. 28, 2009

(65) Prior Publication Data

US 2010/0092368 A1    Apr. 15, 2010

Related U.S. Application Data

(63) Continuation-in-part of application No. 12/459,685, filed on Jul. 6, 2009, now Pat. No. 7,866,638, which is a continuation-in-part of application No. 12/012,568, filed on Feb. 4, 2008, now Pat. No. 7,871,063, which is a continuation of application No. 11/057,539, filed on Feb. 14, 2005, now Pat. No. 7,379,487.

(60) Provisional application No. 61/100,564, filed on Sep. 26, 2008, provisional application No. 61/100,606, filed on Sep. 26, 2008, provisional application No. 61/100,591, filed on Sep. 26, 2008.

(51) Int. Cl.
| *B01D 53/14* | (2006.01) |
| *B01D 53/62* | (2006.01) |
| *F23J 15/04* | (2006.01) |
| *H01S 3/095* | (2006.01) |
| *H01S 3/22* | (2006.01) |

(52) U.S. Cl.
CPC .......... *B01D 53/62* (2013.01); *B01D 2259/124* (2013.01); *H01S 3/095* (2013.01); *B01D 2257/504* (2013.01); *B01D 2251/404* (2013.01); *H01S 3/2215* (2013.01); *B01D 2251/402* (2013.01); *Y02C 10/04* (2013.01); *B01D 2259/126* (2013.01); *B01D 2251/604* (2013.01); *F23J 2219/40* (2013.01); *F23J 2215/50* (2013.01); *F23J 15/04* (2013.01)
USPC ........ 95/36; 95/224; 95/236; 96/271; 96/322; 423/220; 423/225; 423/228; 423/232; 423/234

(58) Field of Classification Search
USPC .................... 423/437.1, 220, 230; 95/36, 151
See application file for complete search history.

(56) References Cited

U.S. PATENT DOCUMENTS

| 441,106 A | 11/1890 | Monsanto |
| 2,484,277 A | 10/1949 | Fisher |

(Continued)

FOREIGN PATENT DOCUMENTS

| CN | 1642628 | 7/2005 |
| GB | 2059286 A | 4/1981 |

(Continued)

OTHER PUBLICATIONS

U.S. Appl. No. 12/586,807, filed Sep. 28, 2009, titled "Apparatus and method thereof."

(Continued)

*Primary Examiner* — Duane Smith
*Assistant Examiner* — Pankti Patel
(74) *Attorney, Agent, or Firm* — Aspire IP; Scott J. Hawranek

(57) ABSTRACT

The invention generally relates to a method for sequestration contaminates. More particularly, the invention relates to a significant performance enhancement over existing mineral carbonation processes through the use of a high mass transfer system and an efficient pH swing reaction. More particularly, aspects of the invention are directed to direct and indirect methods of sequestering contaminates.

39 Claims, 10 Drawing Sheets

(56) References Cited

U.S. PATENT DOCUMENTS

| | | | |
|---|---|---|---|
| 2,604,185 A | 7/1952 | Johnstone et al. | |
| 2,631,019 A | 3/1953 | Yates | |
| 2,687,614 A | 8/1954 | Goddard | |
| 3,089,757 A * | 5/1963 | Buswell et al. | 422/106 |
| 3,215,415 A | 11/1965 | Stephens et al. | |
| 3,237,381 A | 3/1966 | Hvostoff et al. | |
| 3,465,504 A | 9/1969 | Oropeza et al. | |
| 3,488,924 A | 1/1970 | Reeve | |
| 3,524,630 A | 8/1970 | Marion | |
| 3,533,560 A | 10/1970 | Meek | |
| 3,582,050 A | 6/1971 | Kozak | |
| 3,607,624 A | 9/1971 | Moody et al. | |
| 3,731,461 A | 5/1973 | Hamon | |
| 3,766,489 A | 10/1973 | Rosenberg et al. | |
| 3,840,304 A | 10/1974 | Hirafuji | |
| 3,847,714 A | 11/1974 | Davies et al. | |
| 3,914,348 A | 10/1975 | Kors et al. | |
| 3,934,012 A | 1/1976 | Schievelbein | |
| 3,948,608 A * | 4/1976 | Weir, Jr. | 422/169 |
| 3,984,786 A | 10/1976 | Pike | |
| 3,985,860 A | 10/1976 | Mandelik | |
| 4,011,287 A | 3/1977 | Marley | |
| 4,026,682 A | 5/1977 | Pausch | |
| 4,073,832 A | 2/1978 | McGann | |
| 4,083,932 A * | 4/1978 | Muraco et al. | 423/210 |
| 4,099,140 A | 7/1978 | Snelling et al. | |
| 4,102,982 A * | 7/1978 | Weir, Jr. | 423/243.1 |
| 4,128,206 A | 12/1978 | Bintner | |
| 4,246,245 A | 1/1981 | Abrams et al. | |
| 4,261,511 A | 4/1981 | Erb et al. | |
| 4,269,812 A | 5/1981 | Edwards et al. | |
| 4,284,590 A | 8/1981 | DeBoer et al. | |
| 4,310,476 A | 1/1982 | Nahra et al. | |
| 4,314,670 A | 2/1982 | Walsh | |
| 4,326,553 A | 4/1982 | Hall | |
| 4,340,572 A | 7/1982 | Ben-Shmuel et al. | |
| 4,343,771 A | 8/1982 | Edwards et al. | |
| 4,348,432 A | 9/1982 | Huang | |
| 4,363,786 A * | 12/1982 | Adams et al. | 422/605 |
| 4,378,236 A | 3/1983 | Helms | |
| 4,403,324 A | 9/1983 | Woste | |
| 4,419,301 A | 12/1983 | Nahra et al. | |
| 4,507,969 A | 4/1985 | Djordjevic et al. | |
| 4,633,623 A | 1/1987 | Spitz | |
| 4,641,785 A | 2/1987 | Grothe | |
| 4,668,498 A | 5/1987 | Davis | |
| 4,720,290 A | 1/1988 | McCoy | |
| 4,740,308 A | 4/1988 | Fremont et al. | |
| 4,744,518 A | 5/1988 | Toth | |
| 4,810,268 A | 3/1989 | Chambers et al. | |
| 4,819,878 A | 4/1989 | Bailey et al. | |
| 4,828,768 A | 5/1989 | Talmor | |
| 4,834,288 A | 5/1989 | Kenney et al. | |
| 4,887,100 A | 12/1989 | Michaelis et al. | |
| 4,893,754 A | 1/1990 | Ruiz | |
| 4,913,225 A | 4/1990 | Chubb | |
| 4,915,914 A * | 4/1990 | Morrison | 422/168 |
| 4,948,402 A | 8/1990 | Davis | |
| 4,968,328 A | 11/1990 | Duke | |
| 4,989,788 A | 2/1991 | Bendig et al. | |
| 5,057,853 A | 10/1991 | Fisher | |
| 1,538,457 A | 3/1992 | Zoelly | |
| 5,170,727 A | 12/1992 | Nielsen | |
| 5,202,103 A * | 4/1993 | Chang et al. | 423/242.7 |
| 5,269,967 A | 12/1993 | Achgill | |
| 5,330,563 A | 7/1994 | Yamase et al. | |
| 5,364,604 A | 11/1994 | Spink et al. | |
| 5,392,988 A | 2/1995 | Thayer | |
| 5,395,482 A | 3/1995 | Onda et al. | |
| 5,419,487 A | 5/1995 | Nielsen et al. | |
| 5,464,154 A | 11/1995 | Nielsen | |
| 5,474,597 A | 12/1995 | Halldin | |
| 5,544,571 A | 8/1996 | Nahra et al. | |
| 5,565,180 A | 10/1996 | Spink | |
| 5,580,531 A | 12/1996 | Vassiliou et al. | |
| 5,615,836 A | 4/1997 | Graef | |
| 5,634,413 A | 6/1997 | Listner et al. | |
| 5,639,025 A | 6/1997 | Bush | |
| 5,643,799 A | 7/1997 | Atwater | |
| 5,655,255 A | 8/1997 | Kelly | |
| 5,735,465 A | 4/1998 | Laforcade | |
| 5,744,110 A * | 4/1998 | Mimura et al. | 423/226 |
| 5,802,095 A | 9/1998 | Schall | |
| 5,833,148 A | 11/1998 | Steinhilber et al. | |
| 5,837,206 A | 11/1998 | Traffenstedt et al. | |
| 5,870,422 A | 2/1999 | Florentino et al. | |
| 5,893,943 A | 4/1999 | Durham et al. | |
| 5,947,390 A | 9/1999 | Smith | |
| 5,974,072 A | 10/1999 | Hartlove | |
| 6,010,640 A | 1/2000 | Beshore et al. | |
| 6,051,055 A | 4/2000 | Ukawa et al. | |
| 6,072,820 A | 6/2000 | Dickerson | |
| 6,090,186 A | 7/2000 | Spencer | |
| 6,228,145 B1 | 5/2001 | Falk-Pedersen et al. | |
| 6,309,711 B1 | 10/2001 | Tseng et al. | |
| 6,459,717 B1 | 10/2002 | Henshaw | |
| 6,550,751 B1 * | 4/2003 | Brown et al. | 261/113 |
| 6,562,304 B1 * | 5/2003 | Mizrahi | 422/171 |
| 6,612,509 B2 | 9/2003 | Holmstrom | |
| 6,652,624 B2 | 11/2003 | Ku et al. | |
| 6,656,253 B2 | 12/2003 | Willey et al. | |
| 6,714,570 B1 | 3/2004 | Brown | |
| 6,760,406 B2 | 7/2004 | Hertz et al. | |
| 6,824,071 B1 | 11/2004 | McMichael | |
| 6,830,608 B1 | 12/2004 | Peters | |
| 6,843,835 B2 | 1/2005 | Fornai et al. | |
| 6,918,949 B1 | 7/2005 | Peters | |
| 6,938,434 B1 | 9/2005 | Fair | |
| 7,021,571 B1 | 4/2006 | Lawson et al. | |
| 7,066,398 B2 | 6/2006 | Borland et al. | |
| 7,116,696 B2 | 10/2006 | Emanuel | |
| 7,163,163 B2 | 1/2007 | Waddelow | |
| 7,219,849 B1 | 5/2007 | Hedger | |
| 7,285,309 B2 | 10/2007 | Nakamura et al. | |
| 7,318,855 B2 | 1/2008 | Newman et al. | |
| 7,379,487 B2 | 5/2008 | McDermott et al. | |
| 7,604,787 B2 * | 10/2009 | Maroto-Valer et al. | 423/220 |
| 7,618,606 B2 * | 11/2009 | Fan et al. | 423/230 |
| 7,866,638 B2 | 1/2011 | Neumann et al. | |
| 2001/0013554 A1 | 8/2001 | Borland et al. | |
| 2002/0061271 A1 | 5/2002 | Zauderer | |
| 2003/0080447 A1 | 5/2003 | Ye et al. | |
| 2003/0155451 A1 | 8/2003 | Nakamura et al. | |
| 2003/0227955 A1 | 12/2003 | Emanuel | |
| 2004/0126293 A1 * | 7/2004 | Geerlings et al. | 423/228 |
| 2004/0131531 A1 | 7/2004 | Geerlings et al. | |
| 2004/0183216 A1 | 9/2004 | Cross | |
| 2005/0002847 A1 | 1/2005 | Maroto-Valer et al. | |
| 2005/0045752 A1 | 3/2005 | Waddelow | |
| 2005/0109861 A1 | 5/2005 | Chen | |
| 2005/0156064 A1 | 7/2005 | Tanigaki et al. | |
| 2005/0229553 A1 | 10/2005 | TeGrotenhuis et al. | |
| 2006/0016728 A1 | 1/2006 | Shorts | |
| 2006/0182163 A1 | 8/2006 | McDermott et al. | |
| 2007/0085227 A1 | 4/2007 | Tonkovich et al. | |
| 2007/0189949 A1 | 8/2007 | Hsieh et al. | |
| 2008/0119356 A1 * | 5/2008 | Ryu et al. | 502/400 |
| 2008/0175297 A1 * | 7/2008 | McDermott et al. | 372/89 |
| 2008/0210199 A1 | 9/2008 | Zeng et al. | |
| 2010/0319539 A1 | 12/2010 | Neumann et al. | |
| 2010/0320294 A1 | 12/2010 | Neumann et al. | |
| 2011/0061530 A1 | 3/2011 | Neumann et al. | |
| 2011/0061531 A1 | 3/2011 | Neumann et al. | |
| 2011/0072968 A1 | 3/2011 | Neumann et al. | |
| 2011/0081288 A1 | 4/2011 | Neumann et al. | |
| 2011/0126710 A1 | 6/2011 | McDermott et al. | |
| 2013/0062427 A1 | 3/2013 | Neumann et al. | |

FOREIGN PATENT DOCUMENTS

| | | |
|---|---|---|
| JP | 59-88510 | 5/1984 |
| JP | 11-114354 | 4/1999 |
| JP | 11-116223 | 4/1999 |

(56) References Cited

FOREIGN PATENT DOCUMENTS

| JP | 11-197499 | 7/1999 |
|---|---|---|
| JP | 2002-136828 | 5/2002 |
| JP | 2006-255629 | 9/2006 |

OTHER PUBLICATIONS

U.S. Appl. No. 12/586,806, filed on Sep. 28, 2009, titled "Liquid contactor and method thereof."
Huijgen, et al., "Cost Evaluation of CO2 sequestration by aqueous mineral carbonation," Energy Conversion and Management, 48, pp. 1923-1935, 2007.
Cullinane, "Thermodynamics and Kinetics of Aqueous Piperazine with Potassium Carbonate for Carbon Dioxide Absorption", pp. 167-171, Dissertation, The University of Texas at Austin, 2005.
Howells, "Super-Water [R] Jetting Applications From 1974 to 1999", pp. 1-21, 1999.
Oyeneken, et al., "Alternative Stripper Configurations for CO2 Capture by Aqueous Amines", AIChE Journal, vol. 53, No. 12, pp. 3144-3154, 2007.
Kohl, et al. Gas Purification, Gulf Professional Publishing, 5 ed., 1997.
Yeh, et al. Fuel Processing Technology, vol. 86, Issues 14-15, pp. 1533-1546, Oct. 2005.
Van Holst, J., et al. CO2 Capture from Flue Gas Using Amino Acid Salt Solutions, Proceedings of 8th International Conference on Greenhouse Gas Control Technologies, 2006.
Plasynski, et al. Carbon Dioxide Capture by Absorption with Potassium Carbonate, Carbon Sequestration, Project Facts, USDOE, NETL, Apr. 2008.
International Search Report and Written Opinion of the International Searching Authority for PCT/US2009/049707 mailed Aug. 31, 2009.
International Search Report and Written Opinion of the International Searching Authority for PCT/US2009/58634 mailed Jan. 13, 2010.
International Search Report and Written Opinion of the International Searching Authority for PCT/US2009/58637 mailed Jan. 13, 2010.
International Search Report and Written Opinion of the International Searching Authority for PCT/US09/58631 mailed Jul. 28, 2010.
Trachtenberg, MC, et al. "Seventh International Conference on Greenhouse Gas Control Technologies (GHGT-7)," Vancouver, BC, 2004, 1751-1754.
"Carbon Dioxide Storage by Mineral Carbonation," IEA, Report No. 2005/11, Sep. 2005, 41 pages.
"Chilled Ammonia-based Wet Scrubbing for Post-Combustion CO2 Capture," DOE/NETL-401-021507, Feb. 2007, 78 pages.
Ciferno et al., "An Economic Scoping Study for CO2 Capture Using Aqueous Ammonia," DOE/NETL Final Report, 2005, pp. 1-15.

Drbal et al. (eds.), Power Plant Engineering by Black & Veatch, Chapman & Hall, 1996, pp. 1-879.
Kodama et al., "Development of a new pH-swing CO2 mineralization process with a recyclable reaction solution," Energy, May 2008, vol. 33, pp. 776-784.
Lani et al., "Update on DOE/NETL's Advanced Nox Emissions Control Technology R&D Program," U.S. Department of Energy, National Energy Laboratory, Science Applications International Corporation, Nov. 2006, pp. 1-18.
O'Conner et al., "Aqueous Mineral Carbonation: Mineral Availability, Pretreatment, Reaction Parametrics, and Process Studies," National Energy Technology Laboratory (formerly Albany Research Center), DOE/ARC-TR-04-002, Mar. 2005, 459 pages.
International Preliminary Report on Patentability for International (PCT) Patent Application No. PCT/US2009/049707, mailed Nov. 8, 2010.
International Preliminary Report on Patentability for International (PCT) Patent Application No. PCT/US2009/58634, mailed Nov. 22, 2010.
International Preliminary Report on Patentability for International (PCT) Patent Application No. PCT/US2009/58637, mailed Feb. 15, 2011.
Extended Search Report for European Patent Application No. 09817006.1, dated Mar. 28, 2012 10 pages.
Cullinane "Thermodynamics and Kinetics of Aqueous Piperazine with Potassium Carbonate for Carbon Dioxide Absorption," Dissertation, The University of Texas at Austin, May 2005, pp. 209-211.
Definition of "sheet" as found in the Free Dictionary online. Www.thefreedictionary/sheet (Dec. 16, 2011).
Definition of "planar" as found in the Free Dictionary online. Www.thefreedictionary/planar (Dec. 16, 2011).
Search Report for European Patent Application No. 09816647.3, dated Feb. 10, 2012 7 pages.
Search Report for European Patent Application No. 09817000.4, daged Feb. 10, 2012 12 pages.
Search Report for European Patent Application No. 09817003.8, dated Feb. 15, 2012 7 pages.
First Office Action (including translation) for Chinese Patent Application No. 200980145932.2, dated Aug. 14, 2012.
U.S. Appl. No. 13/658,818, filed Oct. 24, 2012, McDermott et al.
First Office Action (including translation) for Chinese Patent Application No. 200980145235.7, dated Feb. 27, 2013.
First Office Action (including translation) for Chinese Patent Application No. 200980145235.7, dated Jan. 23, 2013.
First Office Action (including translation) for Chinese Patent Application No. 200980145726.1, dated Mar. 5, 2013.

* cited by examiner

FIG. 5A
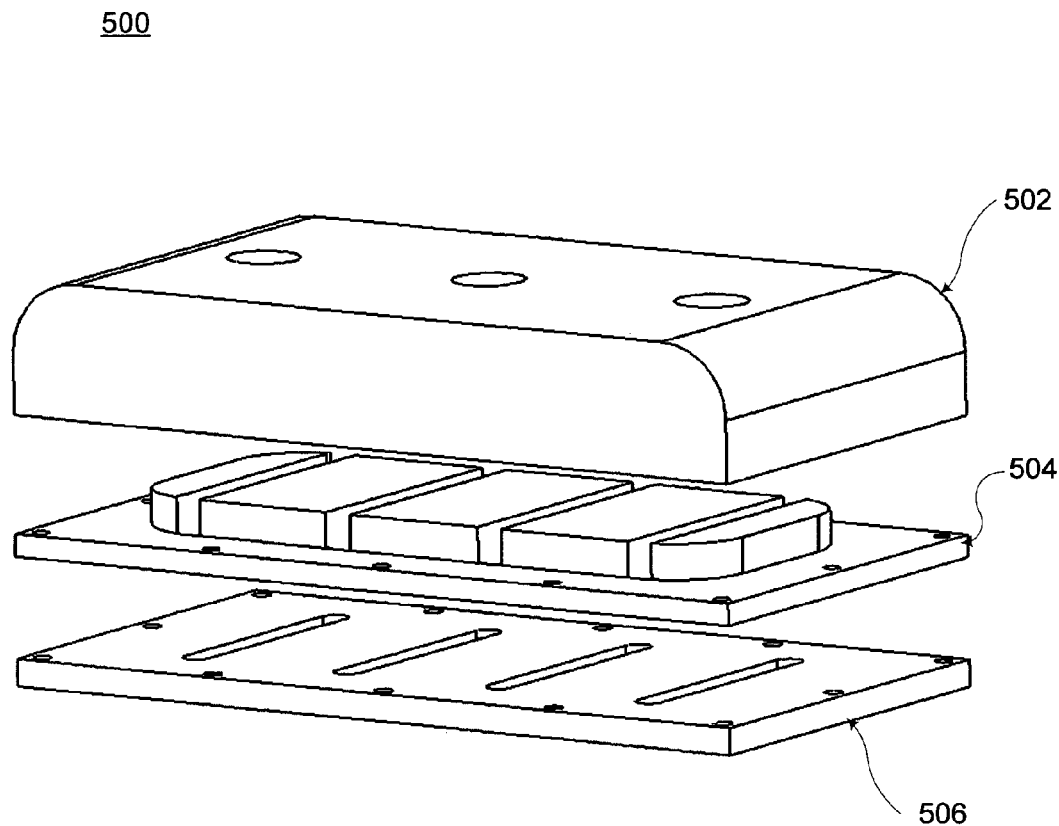
FIG. 5B
FIG. 5C
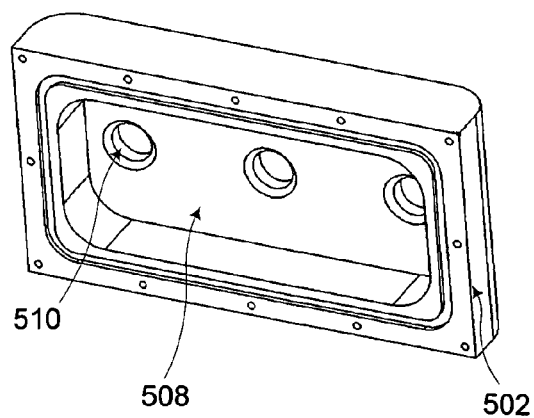
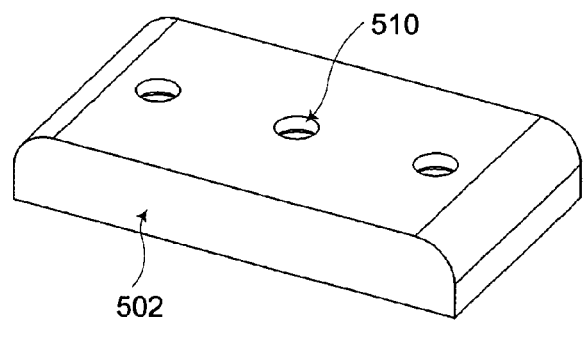

INDIRECT AND DIRECT METHOD OF SEQUESTERING CONTAMINATES

This application is a continuation-in-part of application Ser. No. 12/459,685, entitled "Gas Liquid Contactor and Effluent Cleaning System and Method," filed on Jul. 6, 2009, which is a continuation-in-part of application Ser. No. 12/012,568, entitled "Two Phase Reactor," filed on Feb. 4, 2008, which is a continuation of U.S. patent application Ser. No. 11/057,539, entitled "Two Phase Reactor," filed on Feb. 14, 2005, now U.S. Pat. No. 7,379,487. This application also claims the benefit of U.S. Provisional Application No. 61/100,564, entitled "System for Gaseous Pollutant Removal," filed on Sep. 26, 2008, U.S. Provisional Application No. 61/100,606, entitled "Liquid-Gas Contactor System and Method," filed on Sep. 26, 2008, and U.S. Provisional Application No. 61/100,591, entitled "Liquid-Gas Contactor and Effluent Cleaning System and Method," filed on Sep. 26, 2008, all of which are herein incorporated by reference as if set forth in their entireties.

BACKGROUND OF THE INVENTION

1. Field of the Invention

The invention generally relates to a method for sequestration contaminates. More particularly, the invention relates to significant performance enhancement over existing mineral carbonation processes through the use of a high mass transfer system and an efficient pH swing reaction, e.g., a direct and indirect method of sequestering with a gas liquid contactor.

2. Discussion of the Related Art

Fossil fuel combustion, including coal, petroleum and natural gas, supply more than two thirds of our nation's electricity and nearly all of our transportation energy needs. With our expanding economy and national security needs, our reliance on fossil fuels will likely continue for the next two to three decades. Carbon dioxide has been identified as a Green House Gas (GHG) and is implicated in anthropogenic climate warming. In the U.S., $CO_2$ accounts for nearly 95% of energy related emissions and 85% of the GHG inventory. Various approaches to atmospheric $CO_2$ reduction have been proposed and include reducing GHG source emissions through the use of more energy efficient, renewable and alternative fuel systems, and enhancing the economic viability of technologies that capture and store or sequester $CO_2$.

Reduction in the atmospheric concentration of $CO_2$ greenhouse gas can be achieved by capturing $CO_2$ emissions from large industrial sources and permanently storing captured $CO_2$ in some form. For example, permanent storage of captured $CO_2$ can be achieved by injecting pressurized $CO_2$ underground or undersea. Alternatively, $CO_2$ can be converted to calcium carbonate or magnesium carbonate and land filled. With the $CO_2$ injection approach the risks exist that $CO_2$ will escape from the storage site. To mitigate these risks the $CO_2$ storage sites have to be monitored and the resources have to be committed in case a $CO_2$ leak occurs. If the $CO_2$ is converted to solid carbonates, the risks associated with permanent storage are essentially zero, making this approach to permanent $CO_2$ storage more attractive over the underground $CO_2$ storage approach.

Carbon dioxide sequestration is attractive for GHG reduction because it enables the continued use of fossil fuels including coal, petroleum and natural gas, which supply more than two thirds of our nation's electricity and nearly all of our transportation energy needs. With our expanding economy and national security needs, our reliance on fossil fuels will likely continue for the next two to three decades.

The mineral carbonation process is an attractive storage option for $CO_2$ as it offers many advantages over other sequestration approaches. Primarily these are the formation of geologically stable and environmentally benign carbonates which present minimal safety and legacy issues. However, most mineral carbonation processes have been assessed to be uneconomical due to slow dissolution kinetics and unfavorable carbonation energetics. Huijgen, et al., *Cost evaluation of CO2 sequestration by aqueous mineral carbonation, Energy Conversion and Management*, 48, pp. 1923-1935 (2007), which is hereby incorporated by reference as if fully set forth herein.

SUMMARY OF THE INVENTION

Accordingly, the invention is directed to an indirect and direct method for sequestering contaminates. More particularly, the invention relates to significant performance enhancement over existing mineral carbonation processes through the use of a high mass transfer system and an efficient pH swing reaction that obviates one or more of the problems due to limitations and disadvantages of the related art.

An advantage of the invention is to provide a high mass transfer system having high liquid surface refreshment/renewal rates at a gas liquid interface.

Another advantage of the invention is to provide efficient indirect mineral carbonation process which uses a weak base and a strong acid solvent. The weak base promotes carbon dioxide absorption and the strong acid promotes mineral dissolution.

Yet another advantage of the invention is to provide efficient mineral carbonation process which using phase separation of a solvent.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

An embodiment of the invention is directed towards a method of sequestering gas phase molecules. The method includes forming a plurality of essentially planar liquid jets, each of said liquid jets including a substantially planar sheet of an aqueous slurry solution, and the plurality of liquid jets arranged in substantially parallel planes. A gas is provided with gas phase molecules to a gas liquid contactor. The method also includes mineralizing at least a portion of the gas phase molecules by a mass transfer interaction between the gas phase molecules and an aqueous slurry within the gas liquid contactor.

Yet another embodiment of the invention is directed towards a method of sequestering gas phase molecules. In this embodiment, a plurality of essentially planar liquid jets are formed with a gas liquid contactor. The essentially each of the essentially planar liquid jets include a substantially planar sheet of an aqueous slurry solution, said plurality of liquid jets arranged in substantially parallel planes. A gas is provided to the gas liquid contactor with gas phase molecules and the gas phase molecules are reacted by a mass transfer interaction between the gas phase molecules and an aqueous solution to form a reacted composition. The method also includes reacting at least a portion of the composition to form carbonates in a reactor. Also, the method includes recycling at least a portion of the aqueous composition such that it is reefed into the gas liquid contactor for forming the reacted composition.

Still yet another embodiment of the invention is directed towards direct sequestering carbon dioxide gas phase molecules from a flue gas of a coal fired plant. The method includes forming a plurality of essentially planar liquid jets with a gas liquid contactor. Each of the liquid jets includes a planar sheet of an aqueous slurry solution, and the plurality of liquid jets are arranged in substantially parallel planes. In this embodiment, the aqueous slurry solution includes at least one of $Ca(OH)_2$ and $Mg(OH)_2$ in a range of about 5% (w/w) to about 10% (w/w). Flue gas with the carbon dioxide gas phase molecules is provided to the gas liquid contactor. Carbon dioxide is mineralized by a mass transfer interaction between the carbon dioxide gas molecules and the aqueous slurry solution.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and, together with the description, serve to explain the principles of the invention.

In the drawings:

FIG. 5A illustrates an exploded perspective view of a nozzle apparatus used in Example 1;

FIG. 5B illustrates a bottom perspective view of a plenum used in Example 1;

FIG. 5C illustrates a top perspective view of a plenum used in Example 1;

DETAILED DESCRIPTION OF THE ILLUSTRATED EMBODIMENTS

Figure 1:
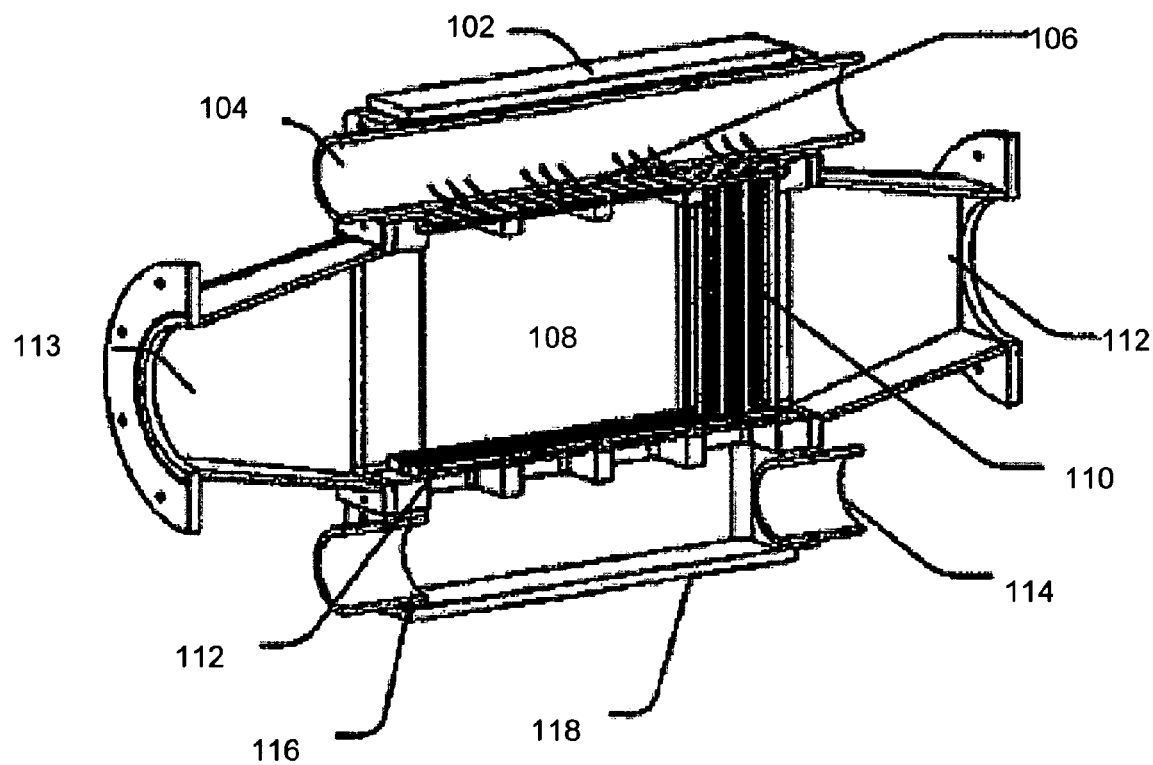
FIG. 1 illustrates a block diagram of a system for producing a flat jet according to an embodiment of the invention.

Embodiments of the invention generally relate to a method for sequestering carbon dioxide for a combustion process, e.g., a coal fired plant. In particular, the invention relates to significant performance enhancement over existing mineral carbonation processes through the use of a high mass transfer system and an efficient pH swing reaction.

Embodiments are directed towards an innovative carbon capture and sequestration system which solves technical, energy and economic feasibility issues of $CO_2$ mineral carbonation and provides for beneficial use of sequestered $CO_2$. In embodiments of the invention a high performance mass transfer system as described in U.S. patent application Ser. No. 12/459,685, entitled "Gas Liquid Contactor and Effluent Cleaning System and Method," filed on Jul. 6, 2009, which is hereby incorporated by reference as if fully set forth herein, is used. This gas liquid contactor is about thirty times less in size and costs about sixty percent less than conventional capture systems with the new mineral carbonation system.

One embodiment of the invention is directed towards a direct sequestering process flow. The direct sequestering process flow allows for sequestration of carbon dioxide in one step, e.g., forming calcium or magnesium carbonate by contacting aqueous slurries of alkaline materials with the flue gas containing $CO_2$ with a gas liquid contactor.

Another embodiment of the invention is directed towards a method of sequestering gas phase including forming a plurality of essentially planar liquid jets, each of said liquid jets including a planar sheet of an aqueous slurry solution, the plurality of liquid jets arranged in substantially parallel planes. Gas phase molecules may be provided and at least a portion of the gas phase molecules may be mineralized by a mass transfer interaction between the gas phase molecules and the aqueous slurry.

The sequestering takes place in a gas liquid contactor. The gas liquid contactor is described with reference to U.S. patent application Ser. No. 12/459,685, entitled "Gas Liquid Contactor and Effluent Cleaning System and Method," filed on Jul. 6, 2009, which is hereby incorporated by reference as if fully set forth herein, is used. In embodiments of the invention gas phase molecules include combustion gases, flue gas, carbon dioxide and combinations thereof. In a preferred embodiment, the gas phase molecules include carbon dioxide to be sequestered.

In embodiments of the invention, the aqueous slurry may include a solid material and water. The solid material includes an alkaline material such as silicates and/or industrial waste alkaline material. The silicates may be calcium/magnesium silicates, e.g., olivine, wollastonite, and serpentine silicates and combinations thereof. The industrial waste alkaline material may include at least one of steel slag, cement kiln dust, fly ash, and combinations thereof. In a preferred embodiment, the aqueous solution includes about 5% (w/w) to about 10% (w/w) $Ca(OH)_2$. The solids may be in a range from about 1% (w/w) to about 20% (w/w).

In a preferred embodiment, the aqueous solution also includes a promoter for $CO_2$ absorption such as an amine. The amine may include monoethanol amine, 1,4-piperazinediethanol, piperazine, hydroxyethylpiperazine and other amines that have a rapid reaction with carbon dioxide as known in the art.

In a preferred embodiment, the aqueous solution may include a corrosion inhibitor and an antifoaming agent. The corrosion inhibitor may include sodium metavanadate ($NaVO_3$) and copper carbonate ($CuCO_3$). The antifoaming agent may include a silicon compound based defoamer including polydimethylsiloxane, hydrophobic silica, silicone glycols and other silicone fluids.

In an embodiment of the invention the gas liquid contactor may also include a plurality of operating modules as described with reference to U.S. patent application Ser. No. 12/459,685, entitled "Gas Liquid Contactor and Effluent Cleaning System and Method," filed on Jul. 6, 2009, which is hereby incorporated by reference as if fully set forth herein.

The method when forming an array of uniformly spaced flat liquid jets step includes forming the flat liquid jets at a liquid plenum pressure in a range from about 2 psig to about 25 psig. The flat liquid jets include at least one of the flat liquid jets in the array with a width greater than about 1 cm. At least one of the flat liquid jets in the array includes a width in a range from about 5 cm to about 15 cm, a thickness in a range from about 10 μm to about 250 μm, a length in a range from about 5 cm to about 30 cm, and at least one of the flat liquid jets in the array has a velocity less than 15 m/sec.

In a preferred embodiment, direct carbonation under mild conditions is the preferred way of converting $CO_2$ into solid carbonates. The overall carbonation reactions are:

$$Ca(OH)_2 + CO_2 \rightarrow CaCO_3 + H_2O \quad \text{R1}$$

$$Mg(OH)_2 + CO_2 \rightarrow MgCO_3 + H_2O \quad \text{R2}$$

Aqueous slurries containing magnesium hydroxide or steel slag solids are contacted with the flue gas using a gas liquid contactor as described with reference to U.S. patent application Ser. No. 12/459,685, entitled "Gas Liquid Contactor and Effluent Cleaning System and Method," filed on Jul. 6, 2009, which is hereby incorporated by reference as if fully set forth herein. In this embodiment, the direct carbonation of the contactor offers two distinctive advantages. The first advantage is the constant agitation of the liquid which promotes the dissolution rates of solids. The second advantage is the high surface refreshment/renewal rate which increases the rate of $CO_2$ capture.

Carbonation proceeds in three steps, with the first step being the dissolution of the solids:

$$Mg(OH)_2 \rightarrow Mg^{2+} + 2OH^- \quad \text{R3}$$

In this embodiment, magnesium hydroxide is substantially dissolved. After the hydroxide ions are created by dissolution, these ions react with the $CO_2$ captured from the flue gas:

$$CO_2 + OH^- \rightarrow HCO_3^- \quad \text{R4}$$

After the $CO_2$ is converted to the bicarbonate ion and then to the carbonate ion, the carbonate ion is reacted with a metal ion to form solid carbonate, for example as shown in the following reaction:

$$Mg^{2+} + CO_3^{2-} \rightarrow MgCO_3 \quad \text{R5}$$

There are more reactions and species involved in the carbonation process than represented by R3-R5, but to keep the discussion simple those additional reactions and species are not included. As was mentioned above, the gas liquid contactor of this invention improves the rates of R3 and R4 processes.

In one embodiment, the rate of the dissolution process (R3) can be defined as:

$$\frac{d[Mg(OH)_2]}{dt} = -k_{sd} S_{solids} = -k_d [Mg(OH)_2] \qquad \text{Eq. 1}$$

The rate of dissolution is proportional to the total surface area of the solids, $S_{solids}$. The rate constant $k_{sd}$ has units of $$\frac{mol}{s \cdot cm^2}.$$

Since the total surface area of solids, $S_{solids}$, is proportional to the solids weight in the slurry, another dissolution rate constant, $k_d$, may be used. This dissolution rate constant has units of $$\frac{1}{s}.$$

Therefore, the rate of the $CO_2$ capture process can be defined as:

$$\frac{d[CO]_2}{dt} = -kS\overline{[CO_2]} \qquad \text{Eq. 2}$$

where k is the mass transfer coefficient, S is the interfacial surface area and $\overline{[CO_2]}$ is the average $CO_2$ driving force. For a given percent of $CO_2$ removal from the flue gas the average $CO_2$ concentration in the reactor is proportional to the inlet $CO_2$ concentration. The mass transfer coefficient, k, depends on the hydroxide concentration. The mass transfer coefficient does not change significantly in the 9<pH<13 range.

Assuming that R5 is not a rate limiting step at steady state, the dissolution rate is equal to the $CO_2$ capture rate. Steady state conditions can be verified by looking at the pH meter reading. When the steady state conditions are achieved, the pH stays constant. The dissolution rate is proportional to the weight percent of the magnesium hydroxide in the slurry. The $CO_2$ capture rate is proportional to the $CO_2$ concentration at the reactor inlet. By adjusting the weight percent of solids in slurry and varying the $CO_2$ concentration at the inlet, the steady state conditions can be achieved and the dissolution rate of the magnesium hydroxide solids may be measured experimentally.

Six direct sequestration Examples were conducted and the details and results are shown in Table 1. The Example details are shown below, Examples 1-6. The statistical error on the mass transfer coefficients is less than about 20%. The systematic error on the mass transfer coefficient is mostly due to the uncertainty in the specific surface area of the contactor.

| Example Number | Description | $CO_2$ Concentration | Mass Transfer Coefficient (cm/s) | Observation |
|---|---|---|---|---|
| 1 | 0.1M KOH solution | 3% | .09 | Baseline test |
| 2 | KOH solution at pH 11.8 | 3% | .08 | Added 0.1M KOH to keep pH constant |
| 3 | 1% Mg(OH)2 | 3% | .07 | Added 1% Mg(OH)$_2$ to keep pH constant |
| 4 | 5% Mg(OH)2 | 3% | .10 | pH held constant throughout example |
| 5 | 1% Steel Slag | 3% | .09 | pH held constant throughout example |
| 6 | 5% Steel Slag | 3% | .12 | pH held constant throughout example |

One parameter of the dissolution of the alkaline solids is the rate limiting step. In the Examples, only when $CO_2$ concentration is dropped to 3% and the magnesium hydroxide weight percent is increased to 5% is the parity between the dissolution rate and the $CO_2$ capture rate achieved. The dissolution rate for steel slag is comparable to the dissolution rate of the magnesium hydroxide, even though steel slag contains a significant amount of inert silica which slows the dissolution. The fact that dissolution rates for slag and magnesium hydroxide are comparable may be related to the fact that the solubility product constant for magnesium hydroxide is much smaller than that for calcium hydroxide.

Another embodiment of the invention is directed towards a method of sequestering gas phase. The method includes forming a plurality of essentially planar liquid jets in a gas liquid contactor. Each of the liquid jets includes a planar sheet of an aqueous solution with the plurality of liquid jets arranged in substantially parallel planes. In this method, a gas is provided with gas phase molecules, and the gas phase molecules are reacted by a mass transfer interaction between the gas phase molecules and an aqueous solution to form a reacted composition.

The aqueous solution includes piperazine and acid, e.g., piperazine and hydrochloric acid. In a preferred embodiment, the molar ratio of hydrochloric acid to piperazine is in a range from about 0.5 to 2. The next step of this method includes reacting in a continuous process reactor with silicates to form the carbonates. The mineralizing includes reacting the reacted material and an alkaline material to form carbonate and mineralizing at least a portion of the reacted composition to form carbonates in a reactor. In another step, at least a portion of aqueous solution is reclaimed and recycled into the gas liquid contactor.

In a preferred embodiment, the continuous reactor is a continuously stirred tank reactor. The thermodynamically favorable mineral carbonation process uses an amine (e.g., piperazine dihydrochloride, $HN(CH_2)_4NH.2HCl$ or Pz.2HCl) as described by reactions (6) and (7):

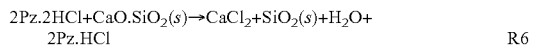

$$2Pz.2HCl+CaO.SiO_2(s) \rightarrow CaCl_2+SiO_2(s)+H_2O+2Pz.HCl \quad \quad R6$$

$$2Pz.HCl+CO_2+CaCl_2+H_2O \rightarrow CaCO_3(s)+2Pz.2HCl \quad \quad R7$$

In this embodiment, the alkalinity extraction reaction (R6) proceeds as written because the singly protonated piperazine product is a thermodynamically favored species for the pH conditions of this step. The carbonation reaction (R7) proceeds as written because the doubly protonated piperazine product is a thermodynamically favored species for the pH conditions of this step. Overall, the reaction of silicate conversion to carbonate is exothermic with $\Delta H=-87$ kJ/mol and $\Delta G=-44$ kJ/mol. One significant advantage of the carbonation chemistry based on using the PZ is that SOx (or NOx) will not have to be separately removed. Through analysis and Examples it has been demonstrated that significant improvements to the capture and sequestration process is energy efficient and cost effective.

Reference will now be made in detail to an embodiment of the present invention, an example of which is illustrated in the accompanying drawings.

FIG. 1 illustrates a block diagram of a system for producing a flat jet according to an embodiment of the invention.

Referring to FIG. 1, a gas liquid contactor is generally depicted as reference number 100. This gas liquid contactor is used in embodiments of the invention for direct and indirect mineralization processes. The gas liquid contactor includes a liquid inlet and a gas inlet. The gas liquid contactor is generally depicted as reference number 100. In this embodiment, a cross flow configuration is utilized, the gas flows from left to right through the contactor 100. Liquid enters the top 102 of the contactor 100 through inlet plenum 104 and is forced through the nozzle plates 106 at the top of the contact chamber 108. In this embodiment, a stability unit is coupled to the nozzle plate and configured to reduce instability of jets formed from the gas liquid contactor.

Substantially stable flat liquid jets are formed by the nozzles and flow down through the chamber. The gas flows from left to right in the system depicted in FIG. 1 between the parallel jets, where the mass transfer takes place, then through the low pressure drop mist eliminator 110, and on to the exit 112 from the entrance 113. The liquid is collected through an anti-splash grid 112 at the bottom of the contactor, treated as necessary, and possibly recycled. The anti-splash grid submodule 112 is a grid with apertures shaped to receive the flat jets. The anti-splash guard or gas fluid separator is also configured to substantially minimize back-splash of liquid in operation. The apertures of the anti-splash grid 112 may be angled slightly towards the exits 114 and/or 116 of the liquid capture outlet plenum 118 to aid in the exit of the fluid without the application of pressure to the fluid. The apparatus may include various modules and nozzles and are described with reference to U.S. patent application Ser. No. 12/459,685, entitled "Gas Liquid Contactor and Effluent Cleaning System and Method," filed on Jul. 6, 2009, which is hereby incorporated by reference as if fully set forth herein.

Figure 2:
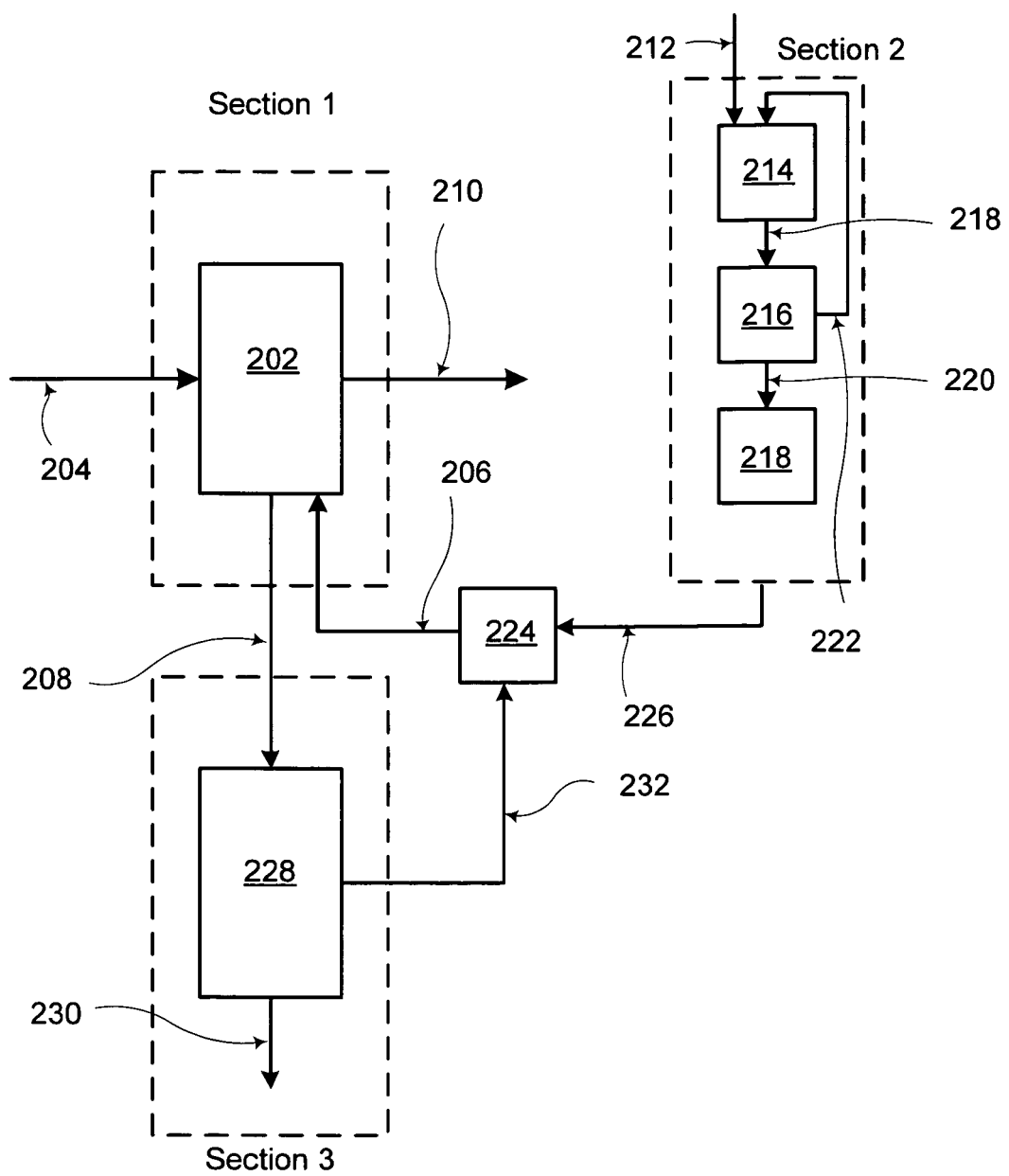
FIG. 2 illustrates a direct sequestering process according to another embodiment of the invention.

FIG. 2 illustrates a direct sequestering process according to another embodiment of the invention.

In this embodiment, the direct sequestering process is described with reference to three Sections. Section 1 includes a gas liquid contactor 202, a gas inlet 204, a fluid inlet 206, a fluid outlet 208 and gas outlet 210. The gas liquid contactor 202 is operated at conditions for forming carbonates, e.g., calcium or magnesium carbonate by contacting aqueous slurries in the inlet 206 containing alkaline materials with the flue gas from the gas inlet 204 with the gas liquid contactor 202. The flue gas may be from a coal power plant or other industrial process and includes contaminants to sequester. In this embodiment, carbon dioxide is included in the flue gas and is mineralized as described herein in a direct process, e.g., one step process with the gas liquid contactor 202.

In this embodiment, the alkaline materials may include magnesium hydroxide, calcium hydroxide, steel slag, cement kiln dust, fly ash, and a combination thereof. The alkaline solids may be prepared by grinding the raw alkaline materials until the particle size is sufficiently small to provide good conversion to carbonates.

Section 2 includes an apparatus for making the raw alkaline materials to be suitable for the mineral carbonation process. The raw material stream 212 enters the grinding system 214 including a grinding apparatus as known in the art. The raw material may include alkaline materials such as magnesium hydroxide, calcium hydroxide, wollastonite, steel slag, cement kiln dust, and the like. Before grinding, the raw material may have to be crushed to make it acceptable for the grinding system. The ground material enters the size sorting system 216 via the stream 218. The size sorting system can be a cyclone or any other system capable of separating the ground solids by size as known in the art. Smaller size solids (mesh size 200 or smaller) are sent to the additional pretreatment step 218 via the stream 220. The larger size solids are sent back to the grinding system 214 via the stream 222. The additional pretreatment step 218 may involve magnetic separation, heating of solids or any other steps which may increase the dissolution rate of the alkaline materials. The ground alkaline solids are sent to a mixer 224.

Section 3 includes a solid separation system 228 that has an input 208 which is the fluid outlet 208 of the gas liquid contactor 202 and an outlet 230 including solid reaction products and a liquid stream 232 sent to the mixer 224.

The solid separation system 228 includes a dewatering system such as a belt filter or a filter press and a system to concentrate solid to on optimal level for operation of the dewatering system. The system for concentration of solids may be a gravity based system such as a thickener or settling tank. Alternatively, the system for concentration of solids may be a hydrocyclone.

The mixer 224 mixes the liquid from the liquid stream 232 and alkaline solids to form a desired aqueous slurry that is output in stream 206. Alternatively, the liquid stream 232 and solid stream 226 can be mixed in the capture system 202.

Figure 3:
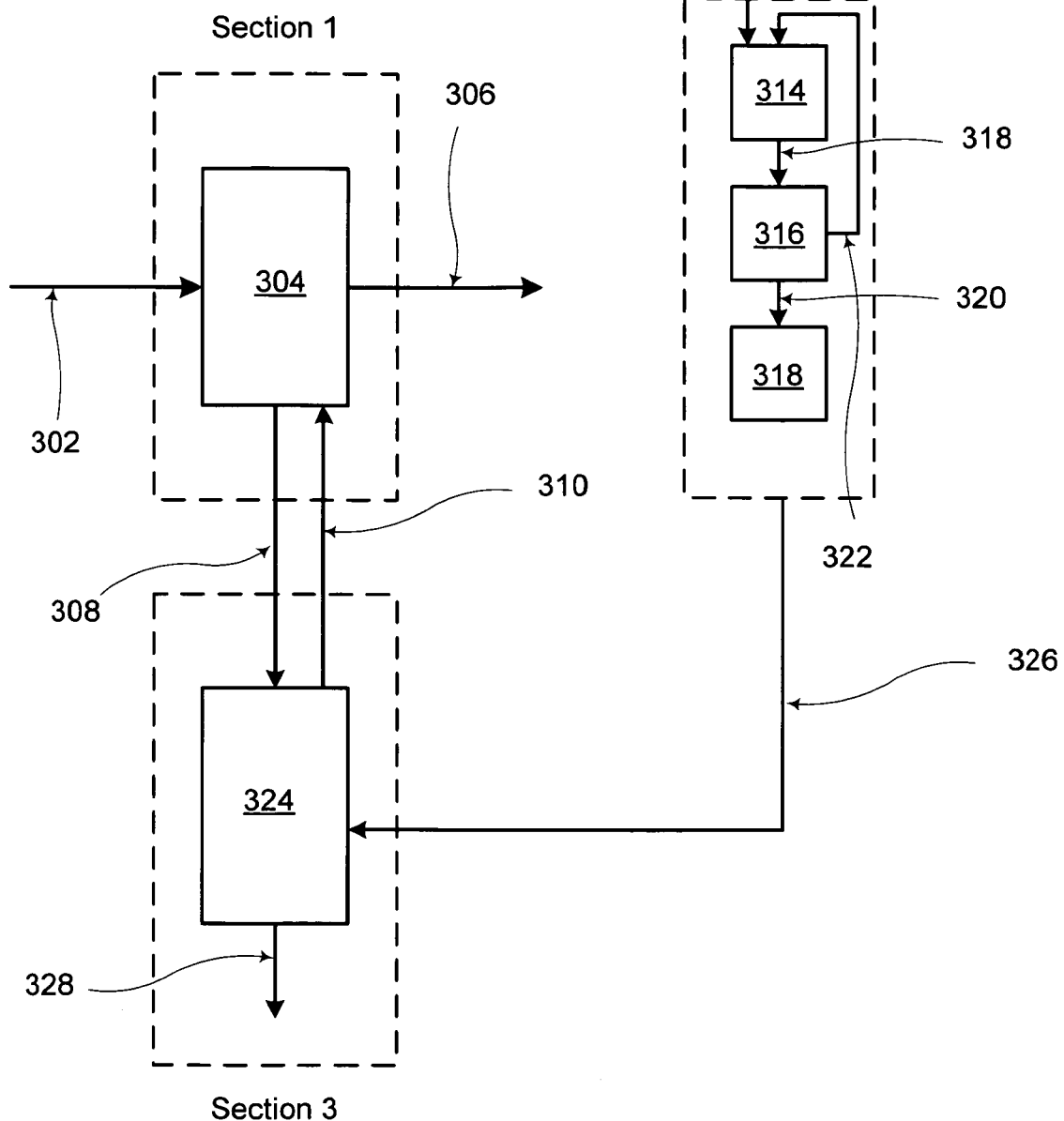
FIG. 3 illustrates an indirect sequestering process according to another embodiment of the invention.

FIG. 3 illustrates an indirect sequestering process according to another embodiment of the invention. In this embodiment, the indirect sequestering process is described with reference to three Sections. Section 1 includes a gas liquid contactor 302, a gas inlet 304, a fluid inlet 310, a fluid outlet 308 and gas outlet 306. The gas liquid contactor 302 is operated at conditions for reacting a flue gas, e.g., containing carbon dioxide, to form a reacted molecule that captures carbon dioxide. The flue gas may be from a coal power plant or other industrial process and include contaminants to sequester. In this embodiment, the fluid inlet 310 includes piperazine dihydrochloride Section 2 includes an apparatus for making the raw alkaline materials to be suitable for the mineral carbonation process. The raw material stream 312 enters the grinding system 314 including a grinding apparatus as known in the art. The raw material may include calcium and magnesium silicates, as well as steel slag and/or other alkaline materials. Before grinding, the raw material may have to be crushed to make it acceptable for the grinding system. The ground material enters the size sorting system 316 via the stream 318. The size sorting system 316 can be a cyclone or any other system capable of separating the ground solids by size as known in the art. Smaller size solids (mesh size 200 or smaller) are sent to the additional pretreatment step 318 via the stream 320. The larger size solids are sent back to the grinding system 314 via the stream 322. The additional pretreatment step 318 may involve magnetic separation, heating of solids or any other steps which may increase the dissolution rate of the alkaline materials. The ground alkaline solids are sent to Section 3 via the stream 326.

Section 3 includes a batch reactor 324 for forming carbonates and the recycling of piperazine which is sent back to the gas liquid contactor 302 via stream 310. The batch reactor also receives alkaline solids via stream 316. In this embodiment, the alkaline materials may include magnesium hydroxide, calcium hydroxide, steel slag, cement kiln dust, fly ash, and combination thereof.

In a continuous reactor the thermodynamically favorable mineral carbonation process using an amine (e.g., piperazine dihydrochloride, $HN(CH_2)_4NH.2HCl$ or $Pz.2HCl$) is described by reactions (8) and (9):

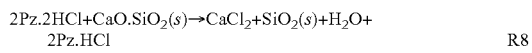
R8

R9

In this embodiment, the alkalinity extraction reaction (R8) proceeds as written because the singly protonated piperazine product is a thermodynamically favored species for the pH conditions of this step. The carbonation reaction (R9) proceeds as written because the doubly protonated piperazine product is a thermodynamically favored species for the pH conditions of this step. Overall, the reaction of silicate conversion to carbonate is exothermic with $\Delta H=-87$ kJ/mol and $\Delta G=-44$ kJ/mol. One significant advantage of the carbonation chemistry based on using the PZ is that SOx (or NOx) will not have to be separately removed. Through analysis and Examples it has been demonstrated that significant improvements to the capture and sequestration process is energy efficient and cost effective.

In a preferred embodiment, piperazine is used due to its thermodynamic properties of piperazine. For example, the high mass transfer coefficients and high $CO_2$ capacity allows for a reduced size of the gas liquid contactor 302 as compared to a direct process. In addition, the operation with piperazine results in a reduced solvent slip and therefore excellent thermal stability and solvent makeup cost. There are also rapid mineral dissolution kinetics. In addition, aqueous solutions containing piperazine can be separated into the piperazine rich and salt rich phases. The phase separation properties of piperazine containing solutions may also be used to conduct calcite precipitation in a controlled manner therefore improving the process robustness. Other amines or a mixture of amines may also be used for the mineral carbonation process.

Finally, as solvent makeup cost is an important aspect to any system this parameter should be considered. Because of the low vapor pressure the piperazine loss due to entrainment in the flue gas is minimal and also losses due to the piperazine coming out with the solids is minimal as well. That is, piperazine may be readily recycled.

Figure 4:
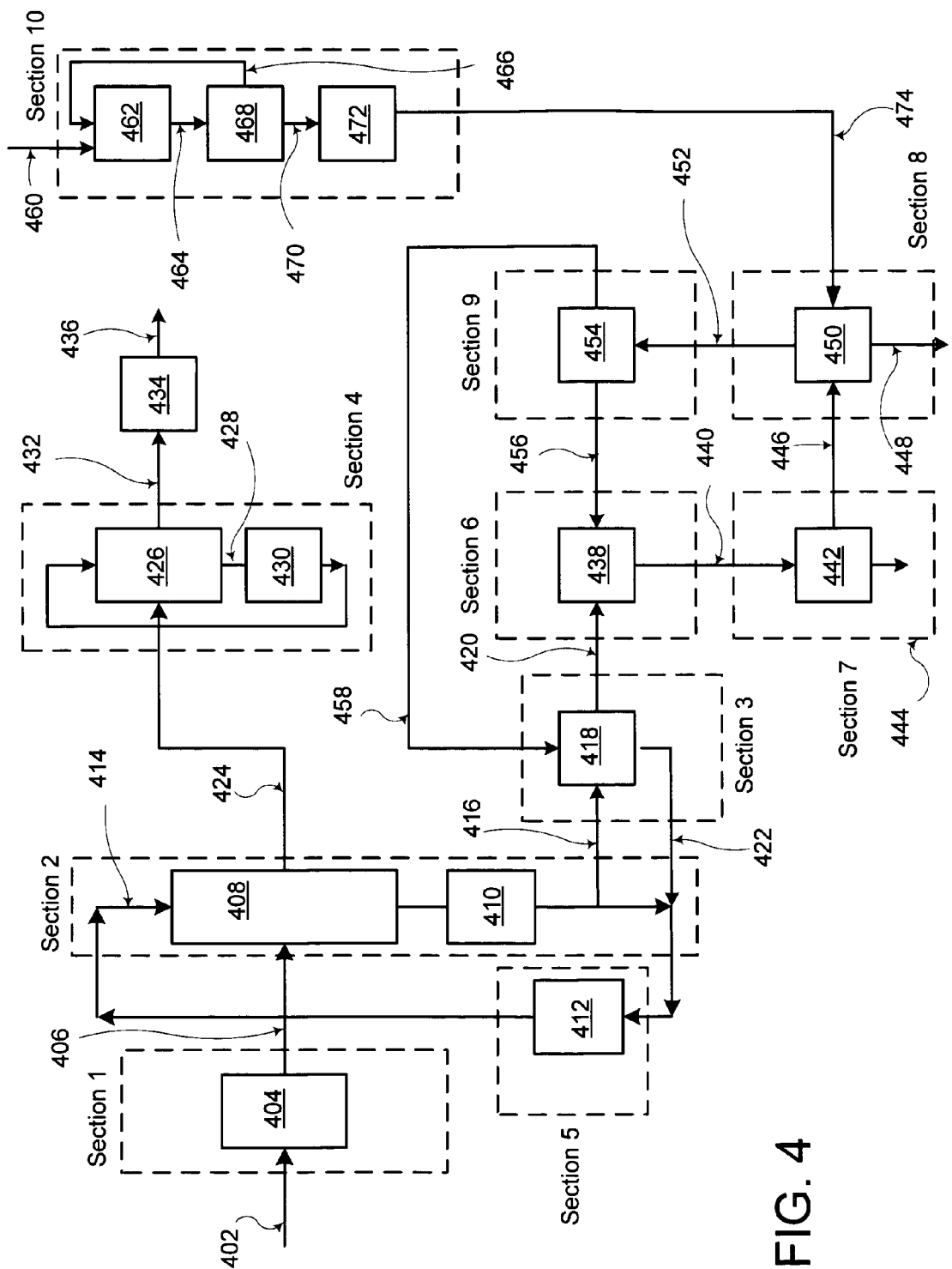
FIG. 4 illustrates a sequestering process according to another embodiment of the invention.

FIG. 4 illustrates a sequestering process according to another embodiment of the invention.

FIG. 4 is a process flow for mineral carbonation process for removing carbon dioxide from combustion gas stream, e.g., from a coal fired plant. Referring to FIG. 4, the process flow includes ten sections.

Section 1 is an optional flue gas conditioning system. Referring to Section 1, it includes an inlet 402 of flue gas into an optional heat exchanger/chiller 404 and an outlet 406. The flue gas conditioning system receives an inlet gas which may have already seen some processing, e.g., processing to remove acid gases such as $SO_2$, HCl, and the like. The heat exchanger/chiller 404 is optional as it depends on the inlet gas constituents and absorber chemistry as known in the art, e.g., ammonia/ammonia carbonate would require a chiller. The flue gas has been cooled and scrubbed of $SO_2$, e.g., from a contactor system (not shown) according to an embodiment of the invention. In this embodiment, the flue gas 402 contains contaminates such as $CO_2$, $N_2$, $H_2O$, $O_2$ and other trace gases.

The flue gas flows through the gas conditioning system (Section 1) into the $CO_2$ scrubber (Section 2) where a significant fraction of the $CO_2$ is removed from the stream by contacting with the solvent.

Section 2 is a $CO_2$ absorber loop. Referring to Section 2, the absorber loop includes gas liquid contactor 408 and a catch tank 410. The gas liquid contactor is a gas liquid contactor as described in U.S. patent application Ser. No. 12/459,685, entitled "Gas Liquid Contactor and Effluent Cleaning System and Method," filed on Jul. 6, 2009, which is hereby incorporated by reference as if fully set forth herein. A heat exchanger/chiller 412 of Section 5 is an optional component. Again, the heat exchanger/chiller 410 is optional as it depends on the inlet gas constituents and absorber chemistry as would be known to one of skill in the art. In this embodiment, the gas liquid contactor is coupled to an outlet 406 of the Section 1.

The gas liquid contactor 408 is coupled to a catch tank 410 and to a heat exchanger/chiller 412 (Section 5) as part of recycle loop.

In operation, the flue gas containing $CO_2$ is directed through an inlet 414 of the gas liquid contactor 408 and stripped of a portion of the $CO_2$. The $CO_2$ absorber loop of Section 2 includes various values and pumps as required for appropriate flow and recycle of the liquid and operation as known in the art. After contacting the gas in the contactor 408, the absorber solution now carries an additional amount of $CO_2$ to catch tank 410 as part of the recirculation loop.

In this embodiment, the energy requirements of the $CO_2$ absorber loop are handled by the heat exchanger/chiller 412 of Section 5. The general chemistry described here, using ammonium carbonate, amines, or alkanolamines, absorbs $CO_2$ more preferably when chilled below the flue gas temperatures seen in typical systems. Therefore, if required, the Section 5 heat exchanger/chiller 412 provides that cooling capacity to maintain optimal operating conditions of the absorber solution.

Section 3 is a $CO_2$ stripper loop. Section 3 includes an inlet 416 coupled to a heat exchanger/chiller 418 having an outlet 420 and 422. The outlet 422 is coupled to a gas liquid contactor 408 via a recycle loop.

Section 4 is an ammonia or amine absorber loop. Section 4 is designed to capture the ammonia or amine slip in the flue gas after it leaves the $CO_2$ absorber 408. This may be a particular issue with $NH_3$, depending on the temperature of the absorber solution (colder leads to less slip). This loop includes a gas liquid contactor 426 coupled to the inlet 424. Again, the gas liquid contactor is described in U.S. patent application Ser. No. 12/459,685, entitled "Gas Liquid Contactor and Effluent Cleaning System and Method," filed on Jul. 6, 2009, which is hereby incorporated by reference as if fully set forth herein.

The gas liquid contactor 426 includes an outlet 428 coupled to catch tank 430, recycle loop, and an outlet 432. If an amine, such as piperazine or alkanolamines, are used as the absorber solution, there is less need for Section 4, thus implementation of such a section would be determined through examination of the overall process requirements and temperatures. This Section 4 is optional as smaller molecular weight amines may slip and it may be advantageous to capture while higher molecular weight amines may not slip and therefore, they may not need to be processed. The output 432 may be directed to a flue gas stack 434 which has an output 436.

Section 6 describes precipitation of mineral carbonate in the precipitation reactor 438. The precipitation reactor 438 is a continuous stir tank reactor as known in the art. In this reactor 438, the stream 420 rich in the carbonate ion, is mixed with the stream 456 rich in the calcium ion. With sufficient residence time, the precipitation reactor calcium carbonate forms and the liquid stream 440 containing precipitated calcium carbonate is sent to the separation system 442.

Section 7 describes separation of solids from the liquid stream in the separation system 442. The separation can be accomplished by a number of methods including belt filter and filter press. In particular, the separation system can include a belt filter for continuous operation. The separation system 442 may include methods for providing the optimum concentration of solids to the belt filter or filter press. These methods may include thickener tanks or some other type of gravity settling methods. Alternatively or in conjunction with gravity, settling hydrocyclones can be used to provide the optimum concentration of solids to the belt filter or filter press. The separation system 442 may also include methods for washing solids in order to decrease amine losses. The solid stream 444 containing mostly solid calcium carbonate with the residual water is either land filled or used for making of the cement. The liquid stream 446 is sent to the alkalinity extractor 450. The alkalinity extractor 450 is a continuous stir tank reactor as known in the art.

Section 8 describes extraction of alkalinity from the alkaline mineral such as wollastonite or from alkaline industrial byproducts such as steel slag, cement kiln dust, etc. In the alkalinity extraction reactor 450 the liquid stream 446 and the solid stream 474 are mixed. The alkalinity extraction reactor includes a mixer and a heater. The mixer and the heater aid in speeding up the rate of the dissolution. The dissolved alkalinity is carried by a stream 452 and the stream 448 contains inert solids such as silica and undissolved materials. Stream 452 is sent to the phase separator 454 where the calcium chloride is separated from amine. The calcium chloride stream 456 is sent to the precipitation reactor 438 and the amine stream is sent to $CO_2$ absorber via the stream 458.

Section 9 describes separation of the stream 452 into the calcium rich and amine rich streams. This may be accomplished for piperazine as described in Cullinane, *Thermodynamics and Kinetics of Aqueous piperazine with Potassium Carbonate for Carbon Dioxide Absorption*, pp. 167-171, Dissertation, The University of Texas at Austin, (2005), which is hereby incorporated by reference as if fully set forth herein. In the alkalinity extraction step, the pH of the liquid increases making piperazine less soluble. The subsequent temperature decrease will cause the piperazine to precipitate from the liquid or separate as a liquid phase. Therefore, the phase separation system should include means for decreasing the temperature of the liquid and for the physical separation of piperazine rich and salt rich phases. The temperature of the liquid can be decreased using a heat exchanger. Potentially, the heat exchanger used for phase separation can be combined with the heat exchanger 418. Physical separation of the piperazine rich and salt rich phases can be accomplished by standard methods. If piperazine precipitates as a solid piperazine hexahydrate, then a system similar to the one described in Section 7 can be used as a mechanical device to accomplish phase separation. Subsequently, the piperazine can be redissolved and sent via the stream 458 to the $CO_2$ capture system. If piperazine separates as a liquid phase, the piperazine rich and salt rich phases can be separated by standard methods. Specifically, methods used for separation of organic from aqueous phases can be used. More specifically, systems for separation of oil from water can be used as a mechanical device to accomplish phase separation.

Section 10 describes the methods for making the raw alkaline materials to be suitable for the mineral carbonation process. The raw material stream 460 enters the grinding system 462 including a grinding apparatus as known in the art. Before grinding, the raw material may have to be crushed to make it acceptable for the grinding system. The ground material enters the size sorting system 468 via the stream 464. The size sorting system can be a cyclone or any other system capable of separating the ground solids by size. The smaller size solids (mesh size 200 or smaller) are sent to the additional pretreatment step 472 via the stream 470. The larger size solids are sent back to the grinding system 462 via the stream 466. The additional pretreatment step 472 may involve magnetic separation, heating of solids or any other steps which may increase the dissolution rate of the alkaline materials.

The operation of the system is in FIG. 4 now described. This system is used for mineral carbonation of $CO_2$ and other constituents in the flue gas to form calcium carbonates by reaction with calcium containing alkaline materials. In this embodiment, the overall reaction is described by the following reaction:

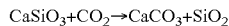

$$CaSiO_3 + CO_2 \rightarrow CaCO_3 + SiO_2$$

In this embodiment, carbon dioxide $CO_2$ enters the mineralization process via the stream 402. The alkaline material enters the process via the stream 460. The calcium carbonate product exits the system through the stream 444. The precipitated calcium carbonate product is of sufficient quality to use in limestone flue gas desulfurization systems or other applications such as paint additives as known in the art. The silica and unreacted alkaline feed material exits the mineralization process via the stream 448.

The flue gas flows through the gas conditioning system (Section 1) into the $CO_2$ scrubber (Section 2) where a significant fraction of the $CO_2$ is removed from the stream by contacting with a solvent, e.g., piperazine hydrochloride. The flue gas exiting the $CO_2$ scrubber is sent through the optional scrubber (Section 4) to strip any amine vapors entrained into the flue gas during the $CO_2$ scrubbing process. Depending on the stack requirements additional flue gas conditioning steps may be required, which take place in block 434.

The solvent flow loop includes streams 416, 420, 440, 446, 452, 458 and 422. The solvent containing high concentration of $CO_2$ (rich stream 416) enters the solvent processing subsystem comprised of Sections 6-9. After the solvent flows through the solvent processing system the solvent containing low concentration of $CO_2$ (lean stream 422) is sent back to the $CO_2$ gas liquid contactor.

The aqueous solvent contains weak base (amine) and strong acid (HCl). The proportion of the acid to base varies throughout the process. The highest ratio of acid to base is in the stream 446 before the alkalinity extraction step 450. The lowest ratio of acid to base is after the alkalinity extraction step 450 in stream 452.

EXAMPLES

Example 1

In Example 1, a small scale nozzle array test apparatus was utilized to quantify the mass transfer of various chemicals under normal operating conditions. This is an example of direct mineralization as the KOH solution used in the gas-liquid contactor directly binds the $CO_2$ from the cross flow gas with a gas liquid contactor utilizing a nozzle plate.

Referring to FIGS. 5A-5B and 6A-6D, a nozzle apparatus is generally depicted as reference number 500. The nozzle apparatus includes a plenum cover 502, flow conditioner 504, and a nozzle plate 506. The nozzle apparatus is used in a gas liquid contactor to form a plurality of liquid jets.

The plenum cover 502 includes a plenum 508 and a liquid entrance 510. The plenum is made with polyvinylchloride (PVC). A pressure gauge (not shown) is arranged to measure fluid pressure in a plenum 508 above a nozzle plate 506. The plenum is a sealed chamber formed above the nozzle plate 506 and has dimensions of about 142 mm wide by about 76 mm tall by about 6.4 mm deep. The nozzle plate 506 includes four nozzle banks 512, 514, 516, and 518. In this configuration each nozzle bank includes 12 nozzles, 506. Each nozzle is separated by a uniform distance—the distance between the nozzles is 4 mm. The distance between the nozzle banks 512, 514, 516, and 518 is uniform. In this example, the distance between nozzle banks is 3 cm.

Figure 5D:
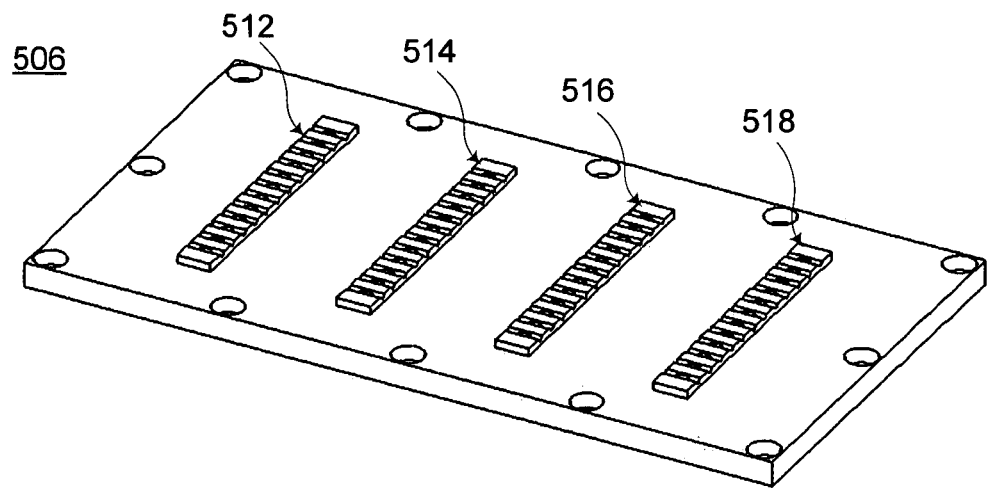
FIG. 5D illustrates an exit side perspective view of a nozzle plate used in Example 1.
Figure 5E:
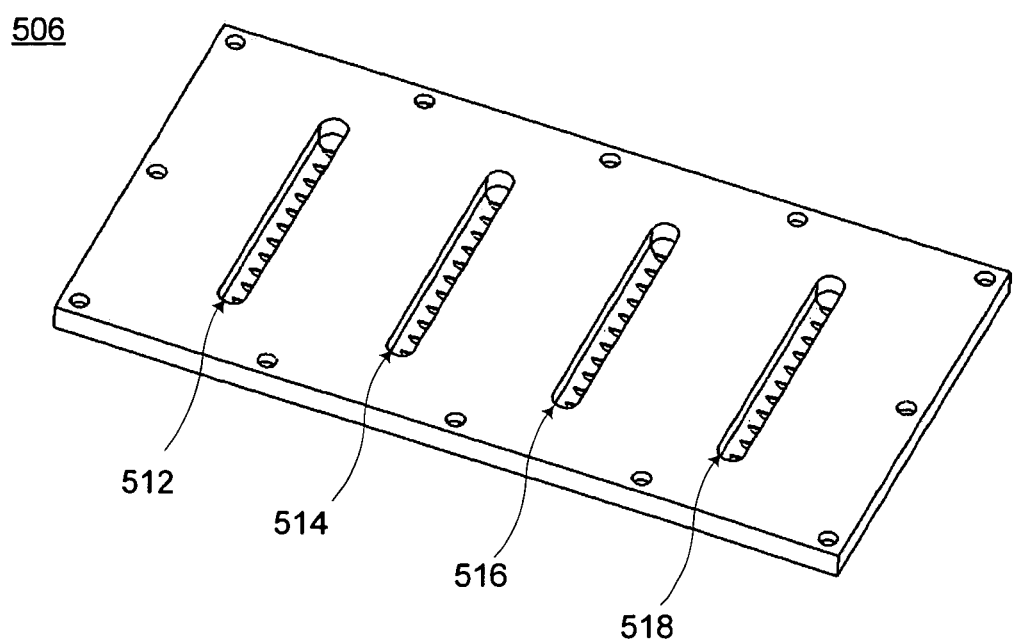
FIG. 5E illustrates an entrance side perspective view of a nozzle plate used in Example 1.
Figure 5F:
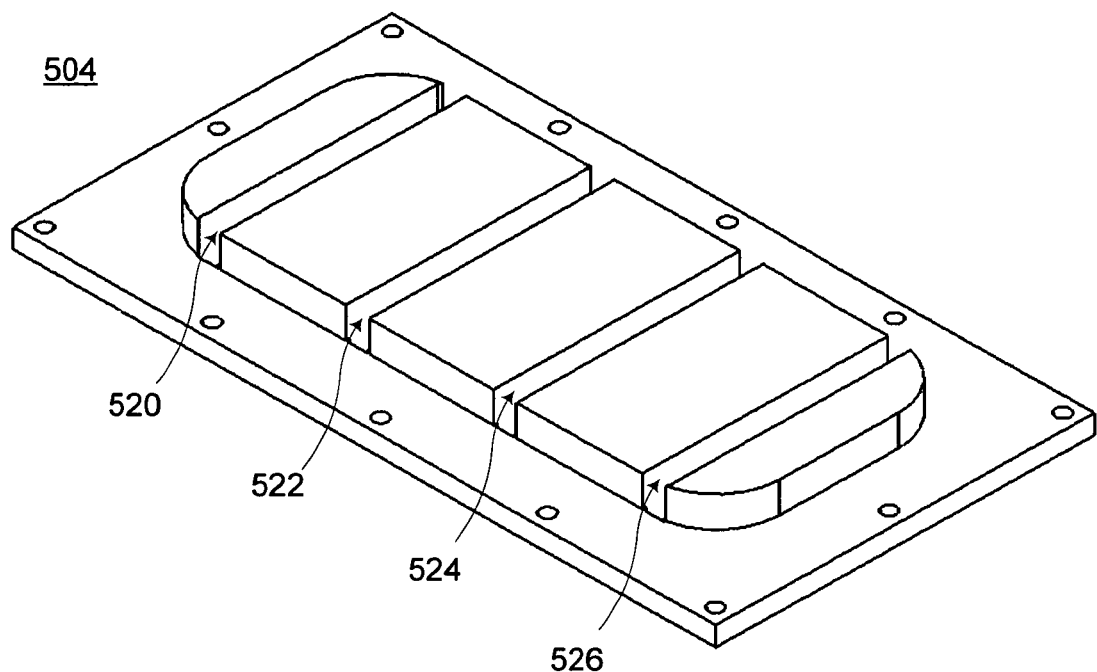
FIG. 5F illustrates a perspective view of a fluid condition used in Example 1.
Figure 6:
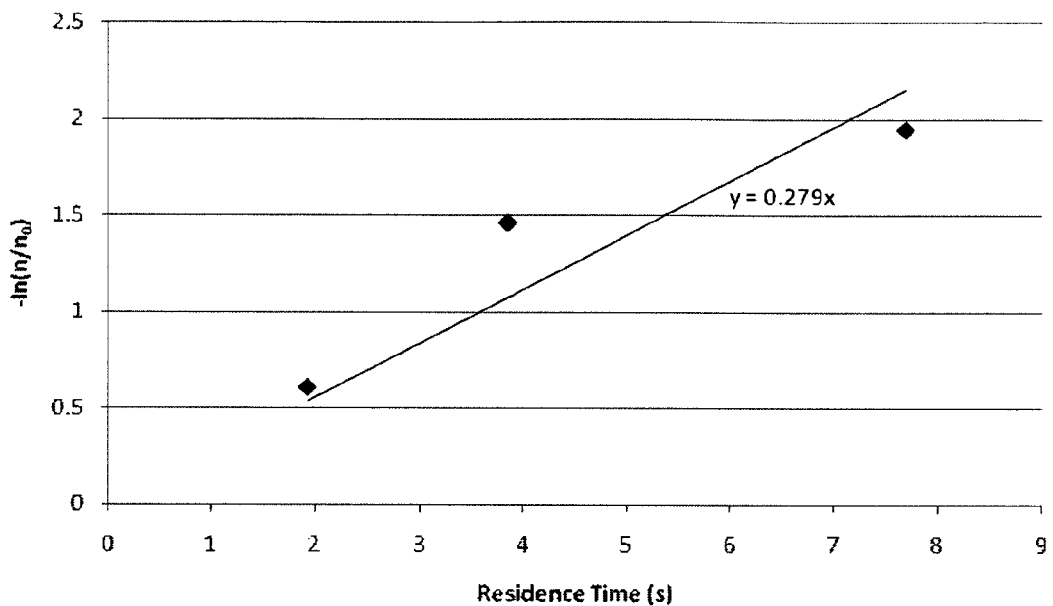
FIG. 6 is a graph of $-\ln(n/n_0)$ versus residence time according to Example 1.

In this embodiment, the nozzles are formed by milling the nozzles into a 316 L stainless steel plate. The milling was conducted with a CNC machine. The entrance side of the nozzle is shown in FIG. 5E and the exit side is shown as FIG. 5D. Each nozzle bank (504, 506, 508, 510) was milled into a stainless steel plate. On one side of the plate a ball mill was used to cut groves that extended 5.5 mm into the plate, shown in FIG. 5E (504, 506, 508, 510). The opposite side (FIG. 5D) of the plate 502 was milled out leaving 4 rows above the channels. A V-shaped groove was cut across the row, at a depth of 0.056 inches that resulted in the formation of the nozzles.

Also, inserted into the plenum is a flow conditioner 504. The conditioner exists to deliver the liquid to the nozzles along a path that is perpendicular to the face of the nozzles. The flow conditioner 504 has four channels (520, 522, 524, 526) that are inline with the four nozzle banks 504, 506, 508, 510 of the nozzle plate 502. The height of the flow channels is 10.4 mm and the width of each channel 6.4 mm.

The purpose of this Example is to determine the mass transfer coefficient for a 0.1M KOH solution used to mineralize carbon dioxide. In previous Examples (not shown) the mass transfer coefficient for a 0.1M KOH solution was about 0.1 cm/s. Therefore, in this Example the mass transfer coefficient should also be about 0.1 cm/s.

In this Example, the concentration of $CO_2$ was about 3% (v/v) in order to keep the pH constant for a longer period of time. This aided in more accurate mass transfer results. This Example used a 0.1M KOH solution that transferred into the catch tank (not shown) and the jets were set with a plenum pressure of about 20 psi. $CO_2$ gas at 3% was sent through the Fourier Transform Infrared (FTIR) spectrometer at different flow rates and reference absorption was recorded. Table 2 below shows the samples pulled with the reference absorption. The wave number used for measuring the absorption was 2308.636 $cm^{-1}$. The reference absorption was recorded for each individual flow rate for better accuracy due to the method used for diluting the $CO_2$ concentration down to 3%.

TABLE 2

| Reference absorption for 3% $CO_2$ gas flow | | |
|---|---|---|
| FTIR File No. | $CO_2$ flow rate (SLM) | Absorption |
| 1 | 10 | .631 |
| 2 | 10 | .582 |
| 3 | 10 | .586 |
| 6 | 20 | .344 |
| 7 | 20 | .340 |
| 11 | 5 | .718 |
| 12 | 5 | .696 |
| 13 | 5 | .641 |
| 14 | 5 | .665 |

The 3% $CO_2$ gas was then cross-flowed with the 0.1M KOH solution at different flow rates. The $CO_2$ flow rates and their corresponding FTIR absorption levels were recorded. Table 3 below shows the samples pulled with the reference absorption. The wave number used for measuring the absorption was 2308.636 $cm^{-1}$.

TABLE 3

| $CO_2$ absorption measured with different $CO_2$ gas flows. | | |
|---|---|---|
| FTIR File No. | $CO_2$ flow rate (SLM) | Absorption |
| 4 | 10 | .134 |
| 5 | 10 | .139 |
| 8 | 20 | .156 |
| 9 | 20 | .185 |

TABLE 3-continued

CO$_2$ absorption measured with different CO$_2$ gas flows.

| FTIR File No. | CO$_2$ flow rate (SLM) | Absorption |
|---|---|---|
| 10 | 20 | .188 |
| 15 | 5 | .091 |
| 16 | 5 | .096 |

Using the data in Tables 2 and 3 above, the mass transfer coefficient was calculated using Equation 3:

$$-\ln(n/n_0) = k \cdot a_s \cdot t \quad \text{Eq. 3}$$

Wherein n is the absorption level measured while cross flowing with the KOH solution, $n_0$ is the reference absorption with a flow of 3% CO$_2$, and t is the residence time for the gas through the jet pack. Next, plotting the $-\ln(n/n_0)$ versus the residence time gave a slope of $ka_s$ in units of $s^{-1}$. In the equation, k is the mass transfer coefficient (cm/s), $a_s$ (cm$^{-1}$) is the specific area of the jet pack, and t is time (seconds). The specific area being used for the jet pack was measured to be about 3 cm$^{-1}$. Using this specific area the mass transfer coefficient can be calculated.

Figure 7:
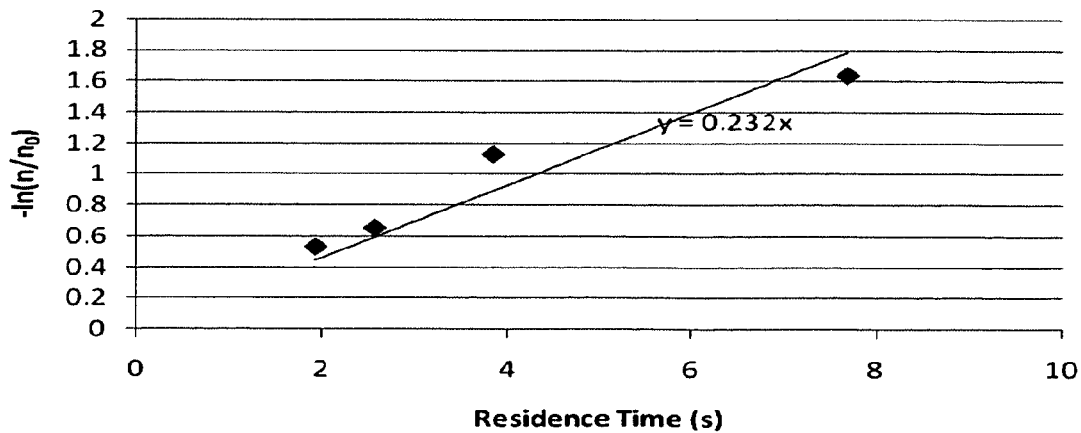
FIG. 7 is a graph of $-\ln(n/n_0)$ versus residence time according to Example 2.

FIG. 7 is a graph of $-\ln(n/n_0)$ versus residence time according to Example 1. In this graph, the slope of the line was determined by plotting the three absorbance data points. The slope was the product of the mass transfer coefficient and the specific area of the jet pack. Dividing by the specific area (3 cm$^{-1}$) gives a mass transfer coefficient of about 0.09 cm/s. Accordingly, this value is close to what was assumed based off measurements in the past. In this Example, the pH of the 0.1M KOH solution also remained at a constant throughout the test due to the lower concentration of CO$_2$.

Example 2

In Example 2, an array of jets were formed with a test stand apparatus as described in Example 1. This is an example of direct mineralization as the KOH solution used in the gas liquid contactor directly binds the CO$_2$ from the cross flow gas. When Mg(OH)$_2$ is added to water, the pH of the solution is 11.8. This will allow for a direct comparison of the dissolution rate between KOH and Mg(OH)$_2$. Theoretically, the dissolution rate of the Mg(OH)$_2$ is the rate limiting step in the system and if we increase the concentration of the Mg(OH)$_2$ our utilization will increase. However, a mixture of Mg(OH)$_2$ and water forms a slurry, so the concentration needs to be increased high enough to obtain good utilization, but not clog the jets. The concentration of CO$_2$ was 3% in order to keep the pH constant for a longer period of time. This will aid in more accurate mass transfer results.

The solution was transferred into the catch tank and the jets were set with a back pressure of 20 psi. CO$_2$ gas at 3% was cross flowed at rates from 5 SLM to 20 SLM, and was sent through the FT-IR where the reference absorption was recorded. The reference absorption was recorded for each individual flow rate for better accuracy due to the method used for diluting the CO$_2$ concentration at 3% in order to keep pH constant for a longer period of time. This aided in more accurate mass transfer results.

In this Example, KOH was added to 5 gallons of water until the pH was steady at 11.8. The solution was transferred into the catch tank (not shown) and the jets were set with a plenum pressure of 20 psi. CO$_2$ gas at 3% was sent through the FTIR at different flow rates where the reference absorption was recorded. Table 4 below shows the samples pulled with the reference absorption. The wave number used for measuring the absorption was 2308.636 cm$^{-1}$. The reference absorption was recorded for each individual flow rate for better accuracy due to the method used for diluting the CO$_2$ concentration down to 3%.

TABLE 4

Reference absorption for 3% CO$_2$ gas flow

| FTIR File No. | CO$_2$ flow rate (SLM) | Absorption |
|---|---|---|
| 1 | 5 | .619 |
| 2 | 5 | .617 |
| 5 | 10 | .543 |
| 6 | 10 | .539 |
| 9 | 15 | .441 |
| 10 | 15 | .441 |
| 17 | 20 | .338 |
| 18 | 20 | .344 |

The 3% CO$_2$ gas was then cross flowed with the KOH solution at different flow rates. The CO$_2$ flow rates and their corresponding FTIR absorption levels were recorded. Table 5 below shows the samples pulled with the reference absorption. The wave number used for measuring the absorption was 2308.636 cm$^{-1}$.

TABLE 5

CO$_2$ absorption measured with different CO$_2$ gas flows.

| FTIR File No. | CO$_2$ flow rate (SLM) | Absorption |
|---|---|---|
| 3 | 5 | .118 |
| 4 | 5 | .120 |
| 7 | 10 | .170 |
| 8 | 10 | .182 |
| 11 | 15 | .229 |
| 12 | 15 | .233 |
| 19 | 20 | .203 |
| 20 | 20 | .208 |

Figure 8:
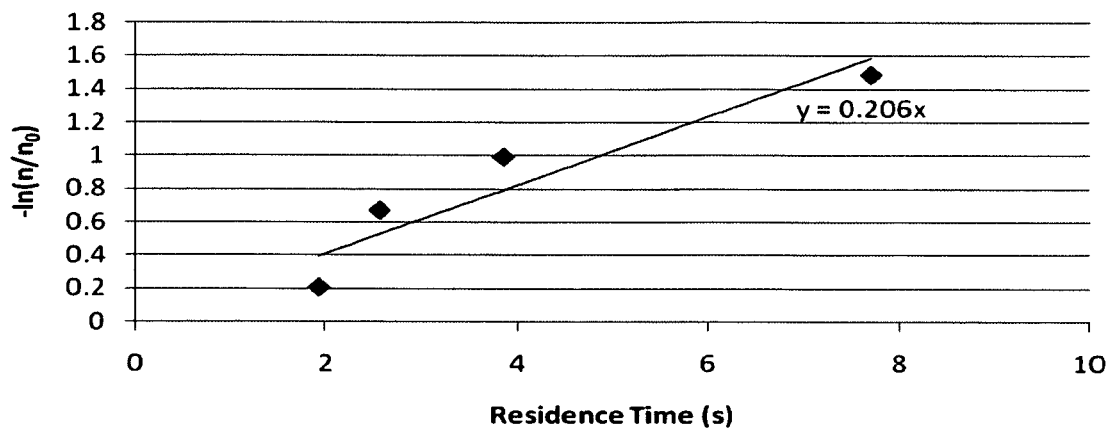
FIG. 8 is a graph of $-\ln(n/n_0)$ versus residence time according to Example 3.

As discussed with reference to Example 1, using the data in Tables 4 and 5 and Eq. 3 the mass transfer coefficient can be calculated. FIG. 8 is a graph of $-\ln(n/n_0)$ versus residence time according to Example 3. In this graph, the slope of the line was determined by plotting four absorbance data points, the slope was the product of the mass transfer coefficient and the specific area of the jet pack. In this Example, the slope was found to be 0.2328 s$^{-1}$. Dividing by the specific area of about 3 cm$^{-1}$ gives a mass transfer coefficient of 0.08 cm/s. With these parameters the mass transfer data from this Example can now be directly compared to the Mg(OH)$_2$ tests to determine if the dissolution rate of the Mg(OH)$_2$ is the limiting reaction for CO$_2$ capture.

Example 3

In Example 3, an array of jets was formed with a test stand apparatus as described in Example 1. In this Example a 1% (w/w) Mg(OH)$_2$ solution which had a pH of 11.8 was utilized. Direct mineralization was conducted as the Mg(OH)$_2$ solution is used in the gas liquid contactor and directly binds the CO$_2$ from the cross flow gas. When Mg(OH)$_2$ is added to water, the pH of the solution is 11.8. Therefore, this will allow for a direct comparison of the dissolution rate between KOH (example 2) and Mg(OH)$_2$. Theoretically, the dissolution rate of the Mg(OH)$_2$ is the rate limiting step in the system and if the amount of Mg(OH)$_2$ is increased the utilization will increase. However, a mixture of Mg(OH)$_2$ and water forms a slurry, so the concentration needs to be increased high enough to obtain good utilization, but not clog the jet nozzles. The concentration of $CO_2$ was 3% in order to keep the pH constant for a longer period of time. This aided in more accurate mass transfer results.

181 g of $Mg(OH)_2$ was added to 5 gallons of water to make a 1% solution that was used in this Example. The solids were sifted through a mesh size of 200 giving a particle size of about 75 microns. The solution was transferred into the catch tank (not shown) and the jets were set with a plenum pressure of about 20 psi.

$CO_2$ gas at 3% was sent through the FTIR at different flow rates where the reference absorption was recorded. Table 6 below illustrates samples pulled with the reference absorption. The wave number used for measuring the absorption was 2308.636 $cm^{-1}$. The reference absorption was recorded for each individual flow rate for better accuracy due to the method used for diluting the $CO_2$ concentration down to 3%.

TABLE 6

Reference absorption for 3% $CO_2$ gas flow

| FTIR File No. | $CO_2$ flow rate (SLM) | Absorption |
|---|---|---|
| 5 | 5 | .625 |
| 6 | 5 | .616 |
| 13 | 10 | .543 |
| 14 | 10 | .541 |
| 17 | 15 | .451 |
| 18 | 15 | .448 |
| 21 | 20 | .315 |
| 22 | 20 | .332 |

The 3% $CO_2$ gas was then cross flowed with the 1% $Mg(OH)_2$ solution at different flow rates. The $CO_2$ flow rates and their corresponding FTIR absorption levels were recorded. Table 7 below illustrates samples pulled with the reference absorption. The wave number used for measuring the absorption was 2308.636 $cm^{-1}$.

TABLE 7

$CO_2$ absorption measured with different $CO_2$ gas flows

| FTIR File No. | $CO_2$ flow rate (SLM) | Absorption |
|---|---|---|
| 7 | 5 | .138 |
| 8 | 5 | .144 |
| 15 | 10 | .199 |
| 16 | 10 | .219 |
| 19 | 15 | .223 |
| 20 | 15 | .243 |
| 23 | 20 | .224 |
| 24 | 20 | .264 |

Figure 9:
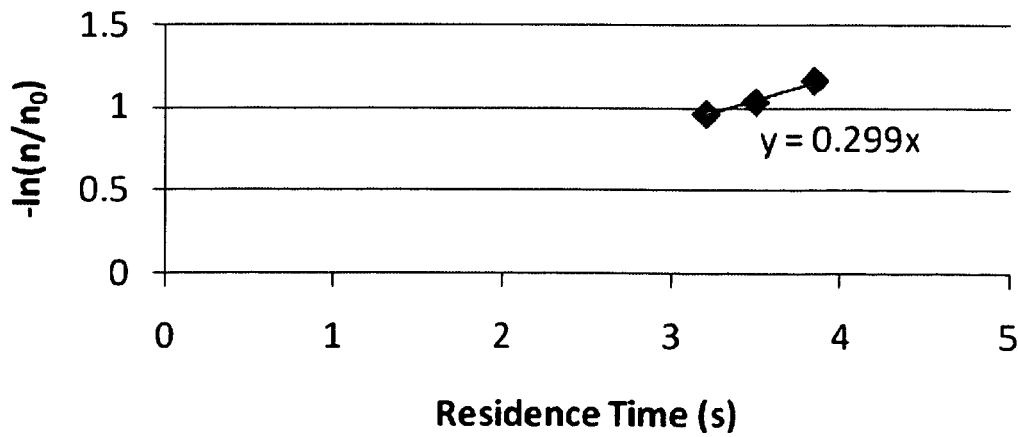
FIG. 9 is a graph of $-\ln(n/n_0)$ versus residence time according to Example 4.

Using the data above the mass transfer coefficient can be calculated using Eq. 3 as discussed with reference to Example 1. FIG. 9 is a graph of $-\ln(n/n_0)$ versus residence time according to Example 3. In this graph, the slope of the line was determined by plotting three absorbance data points, the slope was the product of the mass transfer coefficient and the specific area of the jet pack. In this Example, the slope of the graph was found to be 0.2064 $s^{-1}$. Dividing by the specific area 3 $cm^{-1}$ gives a mass transfer coefficient of about 0.07 cm/s.

This mass transfer coefficient is lower than the mass transfer coefficient of the KOH solution at the same pH, therefore, indicating that the dissolution rate is higher in the KOH solution. If the $Mg(OH)_2$ dissolution rate is the limiting reaction in the $CO_2$ capture system there should be an increase in the mass transfer coefficient and therefore the utilization when the $Mg(OH)_2$ concentration is increased.

This Example shows that it is possible to run aqueous slurries without adverse effects on the apparatus, e.g., without plugging nozzles. In addition, it shows that constant agitation of the liquid promotes dissolution of rates of solids. Also, it is shown that high surface refreshment and renewal rate increases a rate of capture, e.g., $CO_2$ capture.

Example 4

In Example 4, an array of jets was formed with a test stand apparatus as described in Example 1. The purpose of this experiment is to determine the mass transfer coefficient for a $Mg(OH)_2$ solution at a concentration of 5% by weight. In this Example direct mineralization as the $Mg(OH)_2$ solution was conducted. The results of this Experiment are compared directly with Example 3 to verify that $Mg(OH)_2$ dissolution rate is limited.

905 g of $Mg(OH)_2$ was added to 5 gallons of water to make a 5% (w/w) solution. The solids were sifted through a mesh size of 200 giving a particle size of about 75 microns. The solution was transferred into the catch tank (not shown) and the jets were set with a plenum pressure of about 20 psi.

$CO_2$ gas at 3% was sent through the FTIR at different flow rates where the reference absorption was recorded. Table 8 below illustrates samples pulled with the reference absorption. The wave number used for measuring the absorption was 2308.636 $cm^{-1}$. The reference absorption was recorded for each individual flow rate for better accuracy due to the method used for diluting the $CO_2$ concentration down to 3%.

TABLE 8

Reference absorption for 3% $CO_2$ gas flow

| FTIR File No. | $CO_2$ flow rate (SLM) | Absorption |
|---|---|---|
| 22 | 10 | .520 |
| 23 | 10 | .513 |
| 26 | 11 | .500 |
| 27 | 11 | .494 |
| 28 | 11 | .492 |
| 31 | 12 | .478 |
| 32 | 12 | .467 |
| 33 | 12 | .471 |
| 46 | 13 | .467 |
| 47 | 13 | .471 |
| 51 | 14 | .466 |
| 52 | 14 | .452 |
| 53 | 14 | .447 |
| 54 | 14 | .449 |

The 3% $CO_2$ gas was then cross flowed with the 5% $Mg(OH)_2$ solution at different flow rates. The $CO_2$ flow rates and their corresponding FTIR absorption levels were recorded. Table 9 below shows the samples pulled with the reference absorption. The wave number used for measuring the absorption was 2308.636.

TABLE 9

$CO_2$ absorption measured with different $CO_2$ gas flows.

| FTIR File No. | $CO_2$ flow rate (SLM) | Absorption |
|---|---|---|
| 24 | 10 | .158 |
| 25 | 10 | .165 |
| 29 | 11 | .174 |
| 30 | 11 | .174 |

TABLE 9-continued

CO₂ absorption measured with different CO₂ gas flows.

| FTIR File No. | CO₂ flow rate (SLM) | Absorption |
|---|---|---|
| 34 | 12 | .179 |
| 35 | 12 | .184 |

Figure 10:
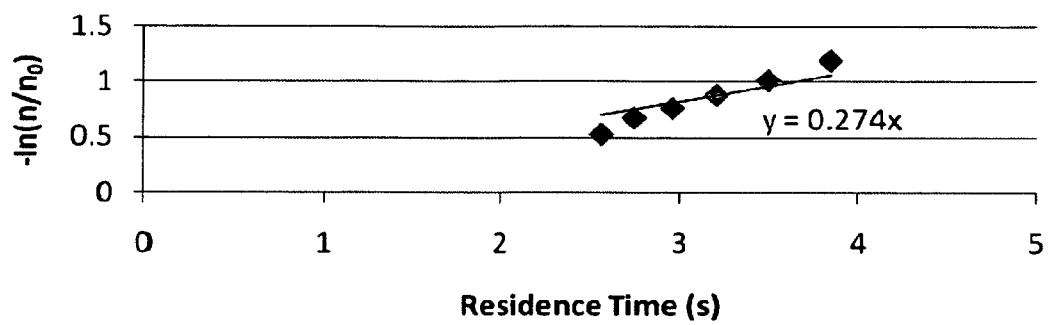
FIG. 10 is a graph of $-\ln(n/n_0)$ versus residence time according to Example 5.
Figure 11:
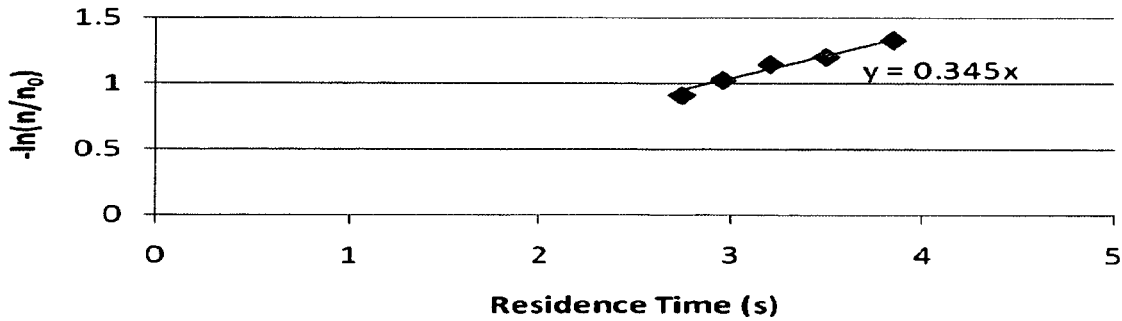
FIG. 11 is a graph of $-\ln(n/n_0)$ versus residence time according to Example 6.

Using the data above the mass transfer coefficient can be calculated using Eq. 3 as discussed with reference to Example 1. FIG. 10 is a graph of $-\ln(n/n_0)$ versus residence time according to Example 4. In this graph the slope of the line was determined by plotting three absorbance data points. The slope was the product of the mass transfer coefficient and the specific area of the jet pack. In this Example, the slope of the graph was found to be 0.2998 $s^{-1}$. Dividing by the specific area of about 3 $cm^{-1}$ gives a mass transfer coefficient of about 0.10 cm/s. This mass transfer coefficient is higher than both the KOH solution (Examples 1 and 2) and the 1% $Mg(OH)_2$ solution (Example 3) at the same pH.

The mass transfer plots from these two tests were also adjusted to focus on the flow rates between 10 SLM and 15 SLM. This indicates that although the dissolution rate is higher in the KOH solution the 5% $Mg(OH)_2$ solution will have better utilization due to the increased concentration. The pH of the 5% $Mg(OH)_2$ also remained constant throughout the experiment due to the higher concentration of hydroxide in the solution. This Example shows that the mass transfer coefficients between the KOH solution and the $Mg(OH)_2$ solution are very similar.

Example 5

In Example 5, an array of jets was formed with a test stand apparatus as described in Example 1. The purpose of this Example was to determine the mass coefficient for a 1% (w/w) steel slag solution. In this Example direct mineralization of a steel slag solution was conducted. This Example permits a direct comparison of the dissolution rate between steel slag and $Mg(OH)_2$. Both solutions can be used in order to produce a carbonate solid when reacted with $CO_2$. This Example shows which solution yields better utilization at comparable slurry concentrations. In this Example, a mixture of steel slag and water forms slurry, so the concentration needs to be increased high enough to obtain good utilization, but not clog the jets.

181 g of steel slag was added to 5 gallons of water to make a 1% (w/w) solution. The solids were sifted through a mesh size of 200 giving a particle size of about 75 microns. The solution was transferred into the catch tank (not shown) and the jets were set with a back pressure of 20 psi.

$CO_2$ gas at 3% was sent through the FTIR at different flow rates where the reference absorption was recorded. Table 10 below illustrates samples pulled with the reference absorption. The wave number used for measuring the absorption was 2308.636 $cm^{-1}$. The reference absorption was recorded for each individual flow rate for better accuracy due to the method used for diluting the $CO_2$ concentration down to 3%.

TABLE 10

Reference absorption for 3% CO₂ gas flow

| FTIR File No. | CO₂ flow rate (SLM) | Absorption |
|---|---|---|
| 1 | 10 | .535 |
| 2 | 10 | .522 |

TABLE 10-continued

Reference absorption for 3% CO₂ gas flow

| FTIR File No. | CO₂ flow rate (SLM) | Absorption |
|---|---|---|
| 5 | 11 | .516 |
| 6 | 11 | .508 |
| 7 | 11 | .507 |
| 11 | 12 | .486 |
| 12 | 12 | .485 |
| 15 | 13 | .469 |
| 16 | 13 | .468 |
| 20 | 14 | .445 |
| 21 | 14 | .444 |
| 26 | 15 | .426 |
| 27 | 15 | .425 |

The 3% $CO_2$ gas was then cross flowed with the 1% steel slag solution at different flow rates. The $CO_2$ flow rates and their corresponding FTIR absorption levels were recorded. Table 11 below shows the samples pulled with the reference absorption. The wave number used for measuring the absorption was 2308.840 $cm^{-1}$.

TABLE 11

CO₂ absorption measured with different CO₂ gas flows.

| FTIR File No. | CO₂ flow rate (SLM) | Absorption |
|---|---|---|
| 3 | 10 | .157 |
| 4 | 10 | .160 |
| 8 | 11 | .172 |
| 9 | 11 | .181 |
| 10 | 11 | .184 |
| 13 | 12 | .197 |
| 14 | 12 | .204 |
| 17 | 13 | .207 |
| 18 | 13 | .217 |
| 19 | 13 | .217 |
| 22 | 14 | .211 |
| 23 | 14 | .222 |
| 24 | 14 | .228 |
| 25 | 14 | .231 |
| 28 | 15 | .230 |
| 29 | 15 | .249 |
| 30 | 15 | .255 |

Using the data above the mass transfer coefficient can be calculated using Eq. 3 as discussed with reference to Example 1.

FIG. 10 is a graph of $-\ln(n/n_0)$ versus residence time according to Example 5. The slope of the graph was determined to be 0.2744 $s^{-1}$ and is the product of the mass transfer coefficient and the specific area of the jet pack. Dividing by the specific area about 3 $cm^{-1}$ gives a mass transfer coefficient of about 0.09 cm/s. This mass transfer coefficient is higher than both the KOH solution and the 1% $Mg(OH)_2$ solution. The mass transfer plots from these two tests were also adjusted to focus on the flow rates between 10 SLM and 15 SLM. This test shows that the mass transfer coefficients between the KOH solution and the 1% steel slag solution are similar.

Example 6

In Example 6, an array of jets was formed with a test stand apparatus as described in Example 1. The purpose of this Example was to determine the mass transfer coefficient for a steel slag solution at a concentration of about 5% by weight. This Example permitted a direct comparison of the dissolution rate between 5% steel slag and $Mg(OH)_2$. Both solutions can be used in order to produce a carbonate solid when reacted with CO$_2$. This Example, demonstrates it is at comparable slurry concentrations. In this Example, a mixture of steel slag and water forms slurry, so the concentration needs to be increased high enough to obtain good utilization, but not to clog the jets. The concentration of CO$_2$ was also lowered from 12% down to 3% in order to keep the pH constant for a longer period of time. This aided in more accurate mass transfer results.

905 g of steel slag was added to 5 gallons of water to make a 5% (w/w) solution. The solids were sifted through a mesh size of 200 giving a particle size of about 75 microns. The solution was transferred into the catch tank and the jets were set with a back pressure of 20 psi. CO$_2$ gas at 3% was sent through the FTIR at different flow rates where the reference absorption was recorded. Table 12 below shows the samples pulled with the reference absorption. The wave number used for measuring the absorption was 2308.840. The reference absorption was recorded for each individual flow rate for better accuracy due to the method used for diluting the CO$_2$ concentration down to 3%.

TABLE 12

Reference absorption for CO$_2$ gas flow

| FTIR File No. | CO$_2$ flow rate (SLM) | Absorption |
| --- | --- | --- |
| 31 | 10 | .633 |
| 32 | 10 | .633 |
| 35 | 11 | .625 |
| 36 | 11 | .626 |
| 40 | 12 | .626 |
| 41 | 12 | .627 |
| 44 | 13 | .628 |
| 45 | 13 | .629 |
| 50 | 14 | .624 |
| 51 | 14 | .623 |

The 3% CO$_2$ gas was then cross flowed with the 5% steel slag solution at different flow rates. The CO$_2$ flow rates and their corresponding FTIR absorption levels were recorded. Table 13 below shows the samples pulled with the reference absorption. The wave number used for measuring the absorption was 2308.840 cm$^{-1}$.

TABLE 13

CO$_2$ absorption measured with different CO$_2$ gas flows.

| FTIR File No. | CO$_2$ flow rate (SLM) | Absorption |
| --- | --- | --- |
| 33 | 10 | .167 |
| 34 | 10 | .170 |
| 37 | 11 | .181 |
| 38 | 11 | .187 |
| 39 | 11 | .191 |
| 42 | 12 | .199 |
| 43 | 12 | .199 |
| 46 | 13 | .217 |
| 47 | 13 | .224 |
| 48 | 13 | .229 |
| 49 | 13 | .232 |
| 52 | 14 | .239 |
| 53 | 14 | .249 |
| 54 | 14 | .253 |

Using the data above the mass transfer coefficient can be calculated using the Eq. 3 as described with reference to Example 1. FIG. 10 is a graph of $-\ln(n/n_o)$ versus residence time according to Example 5. The slope of the graph was determined to be 0.3457 s$^{-1}$ and is the product of the mass transfer coefficient and the specific area of the jet pack. Dividing by the specific area about 3 cm$^{-1}$ gives a mass transfer coefficient of about 0.12 cm/s. This mass transfer coefficient is higher than a KOH solution, 1% Mg (OH)$_2$ solution, 5% Mg (OH)$_2$ solution, and the 1% steel slag solution. The mass transfer graph from these Examples were also adjusted to focus on the flow rates between 10 SLM and 15 SLM. The flow controllers used for the experiment had more accuracy in the measurements. The range of the flow controllers were better matched with the desired flow rates.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method of sequestering gas phase molecules in a plurality of sequestration modules, comprising the steps of:
    forming a plurality of flat liquid jets in the plurality of sequestration modules each module arranged substantially adjacent to each other, each of said flat liquid jets comprising a portion including a coalesced structure such that each jet includes a width, thickness and height of an aqueous slurry solution, said plurality of flat liquid jets arranged in substantially parallel planes;
    providing a gas with gas phase molecules in an orientation that allows a portion of the gas to flow between two or more of the substantially parallel planes of the flat liquid jets such that the jets retain their coalesced structure; and
    mineralizing at least a portion of the gas phase molecules by mass transfer interaction between the gas phase molecules and the aqueous slurry solution, wherein the mineralizing is conducted at a pressure of less than about 100 psig.

2. The method of claim 1, wherein the gas phase molecules comprises carbon dioxide.

3. The method of claim 1, wherein the gas phase molecules comprises flue gas from a coal fired plant.

4. The method of claim 1, wherein the aqueous slurry solution comprises a solid material and water in a solution.

5. The method of claim 4, wherein the solid material comprises an alkaline material.

6. The method of claim 5, wherein the alkaline material comprises silicates.

7. The method of claim 6, wherein the silicates comprise calcium/magnesium silicates.

8. The method of claim 7, wherein the calcium/magnesium silicates comprise at least one of olivine, wollastonite, and serpentine.

9. The method of claim 5, wherein the alkaline material comprises an industrial waste alkaline material.

10. The method of claim 9, wherein the industrial waste alkaline material comprises at least one of steel slag, cement kiln dust, and fly ash.

11. The method of claim 1, wherein the aqueous slurry solution comprises at least one of Ca(OH)$_2$ and Mg(OH)$_2$.

12. The method of claim 1, wherein the aqueous slurry solution comprises solids in a range from about 1% (w/w) to about 20% (w/w).

13. The method of claim 1, wherein the aqueous slurry solution comprises about 5% (w/w) to about 10% (w/w) Ca(OH)$_2$.

14. The method of claim 1, wherein the aqueous slurry solution further comprises a promoter of CO$_2$ absorption.

15. The method of claim 14, wherein promoters comprise an amine.

16. The method of claim 15, wherein the amine is selected from the group consisting of (monoethanol amine), 1,4-piperazinediethanol, piperazine, hydroxyethylpiperazine and combinations thereof.

17. The method of claim 1, wherein the aqueous solution further comprises at least one of a corrosion inhibiter and an antifoaming agent.

18. The method of claim 17, wherein the corrosion inhibiter comprises at least one of sodium metavanadate and copper carbonate.

19. The method of claim 17, wherein the antifoaming agent comprises a silicon compound based defoamer comprising at least one of polydimethylsiloxane, hydrophobic silica, and silicone glycols.

20. The method of claim 1, wherein a gas liquid contactor comprises a plurality of operating modules.

21. The method of claim 1, wherein the forming of an array of uniformly spaced flat liquid jets step comprises forming the flat liquid jets at a liquid plenum pressure in a range from about 2 psi to about 25 psi.

22. The method of claim 1, wherein at least one of the flat liquid jets in the array comprises a width greater than about 1 cm.

23. The method of claim 1, wherein at least one of the flat liquid jets in the array comprises a width in a range from about 5 cm to about 15 cm.

24. The method of claim 1, wherein at least one of the flat liquid jets in the array comprises a thickness in a range from about 10 µm to about 250 µm.

25. The method of claim 1, wherein at least one of the flat liquid jets in the array comprises a length in a range from about 5 cm to about 30 cm.

26. The method of claim 1, wherein at least one of the flat liquid jets in the array has a velocity less than 15 msec.

27. A method of sequestering gas phase molecules, comprising the steps of:
    forming a plurality of liquid jets in a gas liquid contactor, each of said liquid jets comprising a planar sheet of an aqueous solution comprising piperazine and an acid, said plurality of liquid jets arranged in substantially parallel planes;
    providing a flue gas with gas phase molecules to the gas liquid contactor;
    reacting at least a portion of the gas phase molecules by mass transfer interaction between the gas phase molecules and the planar sheet of aqueous solution to form a reacted composition; and
    mineralizing at least a portion of the reacted composition to form carbonates, wherein the mineralizing is conducted at a pressure of less than about 100 psig.

28. The method of claim 27, wherein gas phase molecules comprise a flue gas comprising carbon dioxide.

29. The method of claim 27, wherein the aqueous solution comprises piperazine and hydrochloric acid.

30. The method of claim 27, wherein the aqueous solution comprises piperazine and hydrochloric acid, wherein the molar ratio of hydrochloric acid to piperazine is in a range from about 0.5 to 2.

31. The method of claim 27, wherein the mineralizing step comprises reacting the reacted composition in a continuous process reactor with silicates to form the carbonates.

32. The method of claim 27, wherein the mineralizing step comprises reacting the reacted composition with an alkaline material to form carbonates.

33. The method of claim 32, wherein the alkaline material comprises silicates.

34. The method of claim 32, wherein the silicates comprise calcium/magnesium silicates.

35. The method of claim 33, wherein the calcium/magnesium silicates comprise at least one of olivine, wollastonite, and serpentine.

36. The method of claim 32, wherein the alkaline material comprises an industrial waste alkaline material.

37. The method of claim 36, wherein the industrial waste alkaline material comprises at least one of steel slag, cement kiln dust, and fly ash.

38. The method of claim 27, further comprises the step of reclaiming the aqueous solution with a recycle feedback loop.

39. A method of direct sequestering carbon dioxide gas phase molecules from a flue gas of a coal fired plant with a plurality of different sequestration modules, comprising the steps of:
    forming a plurality of essentially planar liquid jets in the plurality of different sequestration modules, each of said liquid jets comprising a planar sheet of an aqueous slurry solution, said plurality of liquid jets arranged in substantially parallel planes in each of the plurality of modules, wherein the aqueous slurry solution comprises at least one of $Ca(OH)_2$ and $Mg(OH)_2$ in a range of about 5% (w/w) to about 10% (w/w);
    providing the flue gas with the carbon dioxide gas phase molecules in a cross flow orientation between two or more of the plurality of liquid jets in each of the plurality of sequestration modules; and
    mineralizing at least a portion of the carbon dioxide gas phase molecules by mass transfer interaction between the carbon dioxide gas molecules and the aqueous slurry solution, wherein the mineralizing is conducted at a pressure of less than about 100 psig.

* * * * *

UNITED STATES PATENT AND TRADEMARK OFFICE
CERTIFICATE OF CORRECTION

PATENT NO. : 8,864,876 B2  Page 1 of 1
APPLICATION NO. : 12/586808
DATED : October 21, 2014
INVENTOR(S) : David Kurt Neumann et al.

It is certified that error appears in the above-identified patent and that said Letters Patent is hereby corrected as shown below:

In the Claims

Claim 26, column 23, line 34, replace "15 msec" with --15 m/sec--.

Signed and Sealed this
Fifteenth Day of September, 2015

Michelle K. Lee
*Director of the United States Patent and Trademark Office*